(12) United States Patent
Teng et al.

(10) Patent No.: US 9,070,494 B2
(45) Date of Patent: Jun. 30, 2015

(54) FIXATION STRUCTURE OF SUPERCONDUCTING CABLE AND FIXATION STRUCTURE OF SUPERCONDUCTING CABLE LINE

(75) Inventors: Jun Teng, Tokyo (JP); Masashi Yagi, Tokyo (JP); Taro Matsuoka, Tokyo (JP); Tokui Yonemura, Chiba (JP); Shuka Yonemura, legal representative, Chiba (JP); Shinichi Mukoyama, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 158 days.

(21) Appl. No.: 13/816,883

(22) PCT Filed: Mar. 16, 2012

(86) PCT No.: PCT/JP2012/056931
§ 371 (c)(1),
(2), (4) Date: Feb. 13, 2013

(87) PCT Pub. No.: WO2012/124810
PCT Pub. Date: Sep. 20, 2012

(65) Prior Publication Data
US 2013/0199821 A1 Aug. 8, 2013

(30) Foreign Application Priority Data

Mar. 17, 2011 (JP) ................................. 2011-058788
Mar. 17, 2011 (JP) ................................. 2011-058795

(51) Int. Cl.
*H01R 4/68* (2006.01)
*H01B 12/02* (2006.01)
(Continued)

(52) U.S. Cl.
CPC ............... *H01B 12/02* (2013.01); *H02G 15/34* (2013.01); *H01B 12/16* (2013.01); *Y02E 40/648* (2013.01); *Y02E 40/647* (2013.01)

(58) Field of Classification Search
CPC ......... H01R 4/68; H02G 15/22; H02G 15/34; H01B 12/16

USPC ......... 174/15.5, 125.1, 84, 15.4, 77; 505/163, 505/230, 926, 434; 29/599; 439/345
See application file for complete search history.

(56) References Cited

U.S. PATENT DOCUMENTS 7,719,130 B2 * 5/2010 Hirose et al. ................ 307/1
2004/0256141 A1 * 12/2004 Fujikami .................. 174/125.1
(Continued)

FOREIGN PATENT DOCUMENTS

| EP | 1 560 292 A1 | 8/2005 | |
| EP | 1560292 A1 * | 8/2005 | ............... H01R 4/68 |

(Continued)

OTHER PUBLICATIONS

International Search Report Issued May 22, 2012 in PCT/JP12/56931 Filed Mar. 16, 2012.
(Continued)

*Primary Examiner* — Timothy Thompson
*Assistant Examiner* — Guillermo Egoavil
(74) *Attorney, Agent, or Firm* — Oblon, McClelland, Maier & Neustadt, L.L.P.

(57) ABSTRACT

A fixation structure for fixing a superconducting cable including a cable core and a thermal insulation tube. The fixation structure includes a fixation box connected to the thermal insulation tube, including a hollow thermal insulation structure, and through which the cable core is passed, a fixation body for fixing the cable core on the inner wall of the fixation box, and a diameter-expanded reinforcement layer that is an electrical insulation layer that has a diameter decreasing toward both ends and is formed on the cable core. A refrigerant flows through the inside of the inner wall of the fixation box. The cable core is fixed on the inner wall with the fixation body through the diameter-expanded reinforcement layer. The structure implements a simple and low-cost fixation structure appropriate for an electric field design.

19 Claims, 21 Drawing Sheets

(51) Int. Cl.
*H02G 15/34* (2006.01)
*H01B 12/16* (2006.01)

(56) References Cited

U.S. PATENT DOCUMENTS

| | | | |
|---|---|---|---|
| 2005/0067174 A1* | 3/2005 | Suzawa et al. | 174/15.5 |
| 2005/0217878 A1* | 10/2005 | Ashibe et al. | 174/15.5 |
| 2007/0084623 A1 | 4/2007 | Yamaguchi | |
| 2008/0110659 A1* | 5/2008 | Ashibe | 174/15.5 |
| 2009/0124505 A1* | 5/2009 | Hirose | 505/230 |
| 2010/0087322 A1* | 4/2010 | Yuan et al. | 505/163 |
| 2012/0186854 A1* | 7/2012 | Choi et al. | 174/22 R |
| 2013/0065766 A1 | 3/2013 | Yuan et al. | |

FOREIGN PATENT DOCUMENTS

| | | | | |
|---|---|---|---|---|
| GB | 1 419 133 A | | 12/1975 | |
| GB | 1419133 A | * | 12/1975 | H02G 15/22 |
| JP | 50-98691 A | | 8/1975 | |
| JP | 02-30233 U | | 2/1990 | |
| JP | 5 11731 | | 2/1993 | |
| JP | 11-121059 A | | 4/1999 | |
| JP | 11121059 A | * | 4/1999 | H01R 4/68 |
| JP | 2002 56729 | | 2/2002 | |
| JP | 2002 75082 | | 3/2002 | |
| JP | 2006-014547 A | | 1/2006 | |
| JP | 2006 32186 | | 2/2006 | |
| JP | 2009 76401 | | 4/2009 | |
| JP | 2009 77594 | | 4/2009 | |
| KR | 100562568 B1 | * | 3/2006 | H01R 4/68 |
| WO | WO 2010/039513 A1 | | 4/2010 | |

OTHER PUBLICATIONS

Extended European Search Report issued Apr. 22, 2014 in Patent Application No. 12756979.6.
Combined Chinese Office Action and Search Report issued Oct. 20, 2014 in Patent Application No. 201280001882.2 (with English language translation).
International Preliminary Report on Patentability issued Sep. 17, 2013 in PCT/JP2012/056931 filed Mar. 16, 2012.
Written Opinion issued May 22, 2012 in PCT/JP2012/056931 filed Mar. 16, 2012 (with English translation).

* cited by examiner

FIXATION STRUCTURE OF SUPERCONDUCTING CABLE AND FIXATION STRUCTURE OF SUPERCONDUCTING CABLE LINE

TECHNICAL FIELD

The present invention relates to a fixation structure of a superconducting cable including a cable core having a former and a superconductor layer, and a fixation structure of a superconducting cable line.

BACKGROUND ART

It is essential for a superconducting cable to circulate a refrigerant around the cable core because it is necessary to maintain the superconductor layer at a cryogenic temperature. The above-mentioned circulation of the refrigerant is essential and a structure for preventing heat invasion from outside is also essential. Further, when a superconducting cable is installed over a long distance, it is necessary to fix the position of the cable core in order to maintain the form of the cable line.

A fixation structure is proposed as the fixation structure of a conventional power cable (for example, Patent Document 1). The fixation structure includes a conductor connecting tube including insertion openings at both ends, a cylindrical electric pole, an electrical insulation unit (fixed electrical insulation portion), and a case. The connection ends of the conductor portions of two power cables connected to each other can be inserted into the insertion openings. The cylindrical electric pole maintains the conductor connecting tube with a pin capable of projecting and provided at a hole having a bottom provided at the conductor connecting tube through an elastic body. The electrical insulation unit is embedded while encompassing the electric pole. The case internally maintains the electrical insulation unit and is bonded to the ends of the two power cables.

CITATION LIST

Patent Document

Patent Document 1: Japanese Patent Utility Model Application Laid-Open No. 05-11731
Patent Document 2: Japanese Patent Application Laid-Open No. 2002-056729

SUMMARY OF THE INVENTION

Problems to be Solved by the Invention

However, the fixation structure of the power cable described in Patent Document 1 has a complicated structure and many components. Thus, there is a problem that the cost increases.

Further, in the fixation structure described in Patent Document 1, the elastic body and the pin are directly connected to the conductor so that the electric field concentrates on the corner or the projection existing on the creepage surface in the case grounded from the high-voltage conductor portion. Thus, a shape for reducing the generated concentration of the electric field and an electrical insulation design of the electrical insulation unit are required in the fixation structure described in Patent Document 1.

Further, it is necessary for the superconducting cable to cool the cable core by supplying a refrigerant around the core. However, the fixation structure described in Patent Document 1 is a mere fixation structure of a power cable, so that a pathway for circulating a refrigerant does not exist around the cable core. Thus, a refrigerant cannot be circulated along the cable.

Further, it is necessary for the superconducting cable to cool the cable core by supplying a refrigerant around the core. However, the fixation structure described in Patent Document 1 is a mere fixation structure of a power cable, so that a pathway for circulating a refrigerant does not exist around the cable core. Thus, a refrigerant cannot be circulated along the cable.

By the way, the superconducting cable cannot fully exert the feature of superconductivity without cooling the superconducting conductor to a cryogenic temperature of around 200° C. below zero. Thus, the superconducting cable is cooled to around 64 to 77 K through a refrigerant typified by liquid nitrogen. To cool the refrigerant, a very expensive refrigerating system capable of cooling the refrigerant to a cryogenic temperature is required (for example, see Patent Document 2).

Further, the Coefficient of Performance (COP) of a cryogenic refrigerator is around 0.06 and very low, so that the electric power rate that is the running cost for cooling becomes enormous. Thus, improvement of the efficiency is required.

Further, regular maintenance of an electric power transmission system is necessary because the reliability is required for the system related to infrastructure. Thus, not only the initial cost but also the running cost or the maintenance cost of the refrigerating system become a heavy burden on a superconducting electric power transmission system.

In other words, to build a superconducting cable, very large initial cost, running cost and maintenance cost are necessary. Thus, the cost reductions are awaited.

An object of the present invention is to provide fixation structures of a superconducting cable and a superconducting cable line that are capable of fixing a cable for which a complicated electrical insulation design is unnecessary while the refrigerant pathway of a liquid refrigerant along the superconducting cable is secured.

Further, another object of the present invention is to reduce the initial cost, the running cost and the maintenance cost.

Means to Solve the Problem

A first aspect of the present invention is a fixation structure of a superconducting cable for fixing a superconducting cable including a cable core formed by sequentially layering a former, a superconductor layer, an electrical insulation layer, a superconducting shield layer, a normal conduction shield layer, and a protection layer, and a thermal insulation tube housing the cable core and having a thermal insulation structure configured of an internal tube and an external tube. The fixation structure includes a fixation box connected to the thermal insulation tube, having a thermal insulation structure configured of an inner wall and an outer wall, through which the cable core penetrates, a fixation body for fixing the cable core on the inner wall of the fixation box and a diameter-expanded reinforcement layer, as an electrical insulation layer, being formed on the cable core and having a diameter decreasing toward both ends. A refrigerant flows through an inside of the inner wall of the fixation box, and the cable core is fixed on the inner wall with a fixation body through the diameter-expanded reinforcement layer.

In a second aspect of the present invention, the fixation body includes a sleeve having a shape corresponding to a shape of an outer periphery surface of the diameter-expanded reinforcement layer in addition to the same structure as the first aspect of the invention.

In a third aspect of the present invention, a reinforcement layer is provided around the diameter-expanded reinforcement layer, and the fixation body presses and holds a portion of the diameter-expanded reinforcement layer through the reinforcement layer in addition to the same structure as the first or second aspect of the invention.

In a fourth aspect of the present invention, a connection portion for bonding and connecting the cable core to the fixation body is provided in addition to the same structure as any one of the first to third aspects of the invention.

In a fifth aspect of the present invention, the fixation body internally includes an intermediate connecting portion in which the former, the superconductor layer, the superconducting shield layer, and the normal conduction shield layer are electrically connected to each other at longitudinal ends of the two cable cores. The intermediate connecting portion includes a cable core structure in which the former, the superconductor layer, the electrical insulation layer, the superconducting shield layer, the normal conduction shield layer, and the protection layer are sequentially layered. And a diameter-expanded reinforcement and electrical insulation layer, which is larger than an outside diameter of the electrical insulation layer of the cable core at a portion other than the intermediate connecting portion, is provided between the superconductor layer and the superconducting shield layer that are connected to each other at the intermediate connecting portion, in addition to the same structure as any one of the first to fourth aspects of the invention.

In a sixth aspect of the present invention, an electrical insulation layer layered between tapered electrical insulation layers of the two cable cores in the intermediate connecting portion is provided, and the diameter-expanded reinforcement and electrical insulation layer is layered so as to cover a splice between the tapered electrical insulation layers is provided, in addition to the same structure as the fifth aspect of the invention.

In a seventh aspect of the present invention, a kind of insulating papers is wound around the diameter-expanded reinforcement and electrical insulation layer in addition to the same structure as the fifth or sixth aspect of the invention.

In an eighth aspect of the present invention, there is provided, in addition to the fixation body, at least one auxiliary fixation body for fixing the cable core on the inner wall. The auxiliary fixation body is fixed on the inner wall with a rod-shaped or block-shaped fixing bracket through a metal ring holding an outer circumference of the cable core, in addition to the same structure as any one of the fifth to seventh aspects of the invention.

In a ninth aspect of the present invention, the fixation body is fixed on the inner wall with a rod-shaped or block-shaped fixing bracket through a sleeve covering an outer circumference of the cable core, in addition to the same structure as any one of the first to eighth aspects of the invention.

In a tenth aspect of the present invention, the fixation body is fixed on the inner wall while dividing an interior region of the fixation box into two, one or more refrigerant flowing holes are formed on the fixation box at both sides with respect to the fixation body, and the inner wall and the outer wall are connected at the refrigerant flowing hole, in addition to the same structure as any one of the first to seventh aspects of the invention.

In an eleventh aspect of the present invention, a refrigerant transporting tube is connected to the refrigerant flowing hole in addition to the same structure as the tenth aspect of the present invention.

In a twelfth aspect of the present invention, there is provided the fixation structure according to the eighth aspect of the present invention, the refrigerant flowing holes that are formed at both sides with respect to the fixation body are connected to each other through the refrigerant transporting tube, in addition to the same structure as the eleventh aspect of the present invention.

A thirteenth aspect of the present invention is a fixation structure of a superconducting cable line that fixes a plurality of superconducting cables using the fixation structure according to the eleventh aspect of the present invention, in which each of the superconducting cables includes a fixation box, and the fixation boxes are connected to each other through the refrigerant transporting tube connected to the refrigerant flowing hole.

In a fourteenth aspect of the present invention, a refrigerant in the fixation boxes does not flow from one side to an other side of the fixation body along the superconducting cable, instead the refrigerant flows to the other fixation box through the refrigerant transporting tube connected to the refrigerant flowing hole, in addition to the same structure as the thirteenth aspect of the present invention.

In a fifteenth aspect of the present invention, a plurality of superconducting cables are placed in parallel, and circulating cooling sections are installed for the superconducting cables at predetermined intervals through the fixation box. The circulating cooling section includes a first refrigerant pathway connecting with the refrigerant pathways of the superconducting cables, a second refrigerant pathway connecting with the refrigerant pathways of the other superconducting cables, and a refrigerator for cooling the refrigerant circulated in the first refrigerant pathway and the second refrigerant pathway, respectively. And each of the first refrigerant pathway and the second refrigerant pathway connects the fixation boxes through the respective refrigerant flowing holes at both sides of the fixation box with respect to the fixation body, in addition to the same structure as the tenth or eleventh aspect of the present invention.

In a sixteenth aspect of the present invention, the circulating cooling section comprises a circulation pump of the refrigerant at only one of the first refrigerant pathway and the second refrigerant pathway in addition to the same structure as the fifteenth aspect of the present invention.

In a seventeenth aspect of the present invention, the circulating cooling section includes an input pathway passing into a cooling portion of the refrigerator and a bypass pathway avoiding the refrigerator at each of the first refrigerant pathway and the second refrigerant pathway, and a temperature of the refrigerant is controlled by adjusting flows of the refrigerants of the input pathway and of the bypass pathway, in addition to the same structure as the fifteenth or sixteenth aspect of the present invention.

In an eighteenth aspect of the present invention, each of the first refrigerant pathway and the second refrigerant pathway of the circulating cooling section leads the refrigerant from a superconducting cable to a different superconducting cable through the refrigerant pathway, in addition to the same structure as any one of the fifteenth to seventeenth aspects of the present invention.

In a nineteenth aspect of the present invention, each of the first refrigerant pathway and the second refrigerant pathway of the circulating cooling section leads the refrigerant from a superconducting cable to the same superconducting cable through the refrigerant pathway, in addition to the same structure as any one of the fifteenth to seventeenth aspects of the present invention.

Advantageous Effects of Invention

The present invention can firmly fix a cable core with a simple structure because the cable core is fixed on the inner wall of a fixation box through a diameter-expanded reinforcement layer that is an electrical insulation layer of which diameter is reduced towards both ends.

Further, the diameter-expanded reinforcement layer of which diameter decreases toward both ends is formed on the cable core and the fixation body fixes the cable core through the diameter-expanded reinforcement layer so that corners and projections are reduced around the cable core and at the fixation structure. Thus, an electric field design having a high insulating capacity is implemented because the concentration of the electric field hardly occurs therein.

When the fixation body includes a sleeve having a shape corresponding to the shape of the outer periphery surface of the diameter-expanded reinforcement layer, the sleeve fixes the cable core on the inner wall of the fixation box. Thus, the cable core can firmly be fixed with a simple structure.

When the inner wall and the outer wall of the fixation box are connected to each other at the position of the refrigerant flowing hole, and the fixation body is provided in order to fix the cable core of the superconducting cable and the inner wall of the fixation box, the cable core can firmly be fixed only by fixing the outer wall of the fixation box or the external tube of the thermal insulation tube. Further, even though the fixation body fixes the superconducting cable while dividing the interior region of the inner wall into two and interrupting the circulation of the refrigerant, the circulation of the refrigerant can be secured because the fixation box includes the refrigerant flowing holes.

Further, by virtue of connecting the inner wall and the outer wall of the fixation box to each other at the position of the refrigerant flowing hole, it becomes possible to minimize the connection so that the heat invasion from the connection to the inside can be reduced.

When, in the circulating cooling section, the refrigerants in a first refrigerant pathway and a second refrigerant pathway are cooled by a single refrigerator, the number of the expensive refrigerators for realizing a cryogenic temperature can be decreased. This can drastically reduce the initial cost to install the equipment of the superconducting cable.

Further, decreasing the number of the refrigerators can also drastically reduce the maintenance cost.

Organizing two refrigerators into one can decrease the number of the motors and the like by half. This reduces mechanical losses caused by the friction heating, for example, at the bearing of the motor and the refrigeration efficiency can be increased. The installation space of the cooling system can be reduced to approximately 50% in comparison with installation spaces under the same output condition.

DESCRIPTION OF EMBODIMENTS

[Outline of Embodiments]
Hereinafter, embodiments of the present invention will be described in detail based on the drawings.

Figure 1:
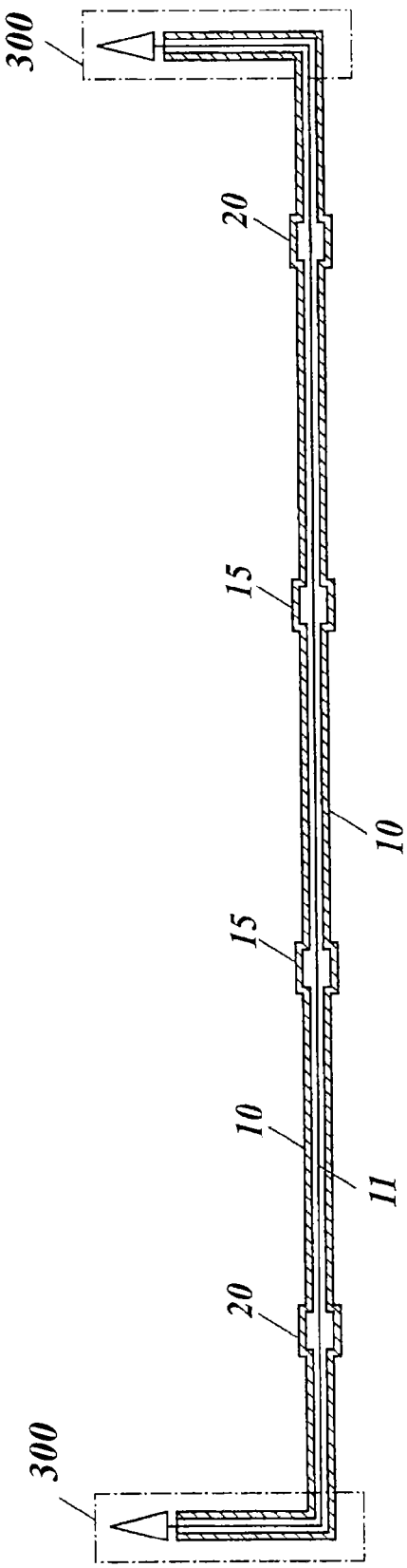
FIG. 1 is a schematic view for illustrating an exemplary installation of a superconducting cable applying a fixation structure of a superconducting cable according to an embodiment.
Figure 2:
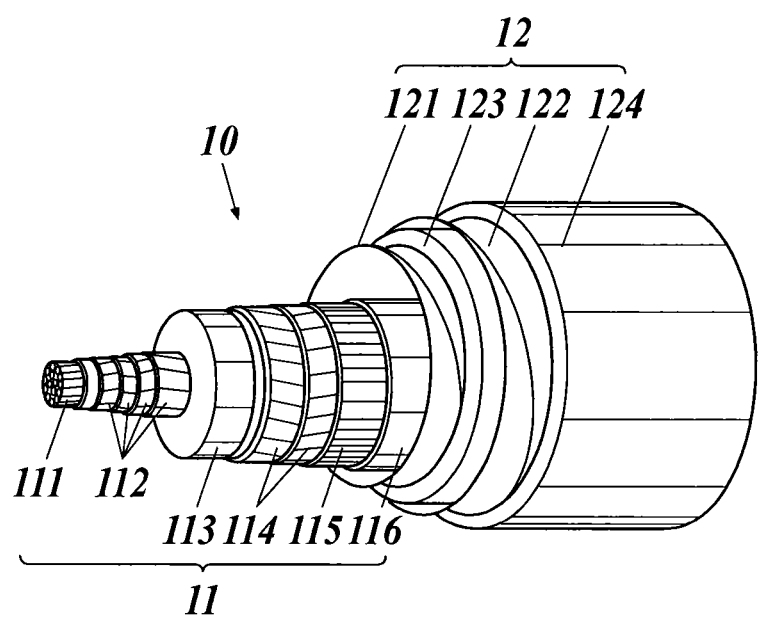
FIG. 2 is a view for illustrating an exemplary superconducting cable to be installed.

FIG. 1 is a schematic view for illustrating an exemplary installation of a superconducting cable applying a fixation structure of a superconducting cable according to an embodiment, and FIG. 2 is a view for illustrating an exemplary superconducting cable to be installed.

As illustrated in FIG. 1, a plurality of superconducting cables 10 connects end connecting portions 300 that are placed at a power source and a power destination. The superconducting cables 10 are connected to each other through an intermediate connecting portion 15. Further, an intermediate fixation portion 20 that works as a fixation structure is formed between the end connecting portions 300 in order to stably hold the superconducting cables 10.

[Superconducting Cable]

The superconducting cable 10 illustrated in FIG. 2 is a single-core superconducting cable in which a single cable core 11 is housed in a thermal insulation tube 12. The cable core 11 includes a former 111, a superconductor layer 112, an electrical insulation layer 113, a superconducting shield layer 114, a normal conduction shield layer 115, a protection layer 116, and the like.

The former 111 is a center core for forming the cable core 11. For example, the former 111 is formed by twisting normal conduction wire material such as copper wires. A fault current that flows in the superconductor layer 112 at a short-circuiting accident is divided to the former 111.

The superconductor layer 112 is formed by spirally winding a plurality of superconducting wire rods around the former 111. The superconductor layer 112 has a layered structure having four layers as shown in FIG. 2. A transmission current flows in the superconductor layer 112 at a steady operation.

The superconducting wire material forming the superconductor layer 112 has a layered structure, for example, an intermediate layer, a superconducting layer, and a protection layer are sequentially formed on a tape-shaped metal substrate. The superconductor forming the superconducting layer is typified by a rare earth element (RE) superconductor that exhibits superconductivity at a temperature equal to or more than liquid nitrogen temperatures and a yttrium-based superconductor (hereinafter, referred to as a Y-based superconductor), for example, denoted with a chemical formula $YBa_2Cu_3O_{7-\delta}$. Alternatively, a tape-shaped superconducting wire material where a superconductor is formed in a metal matrix can be used. A bismuth-based superconductor, for example, the chemical formulas B12Sr2CaCu2O8+$\delta$ (Bi2212), and Bi2Sr2Ca2Cu3O10+$\delta$(Bi2223) can be applied to the superconductor. Note that the $\delta$ in the formulas denotes a non-stoichiometric oxygen ratio.

The electrical insulation layer 113 is formed by a kind of insulating papers, for example, an insulating paper, a semi-synthetic paper formed by bonding an insulating paper to a polypropylene film, or a polymeric non-woven tape. The electrical insulation layer 113 is formed into a layered state by being wound around the superconductor layer 112.

The superconducting shield layer 114 is formed by spirally winding a plurality of superconducting wire material around the electrical insulation layer 113. The superconducting shield layer 114 in FIG. 2 has a layered structure having two layers. Approximately the same current as the conductor current flows in the superconducting shield layer 114 in the opposite phase by electromagnetic induction at a steady operation. A superconducting wire material similar to the superconducting wire material forming the superconductor layer 112 can be applied to the superconducting shield layer 114 as well.

The normal conduction shield layer 115 is formed by winding a normal conduction wire rod such as a copper wire around the superconducting shield layer 114. A fault current that flows in the superconducting shield layer 114 in case of a short-circuiting accident is divided to the normal conduction shield layer 115.

The protection layer 116 is formed, for example, by an insulating paper, or a polymeric non-woven fabric and by winding it around the normal conduction shield layer 115.

The thermal insulation tube 12 has a double-tube structure including a thermal insulation internal tube 121 in which the cable core 11 is housed and a refrigerant (for example, liquid nitrogen) is filled and a thermal insulation external tube 122 that is placed while covering the outer periphery of the thermal insulation internal tube 121.

The thermal insulation internal tube 121 and the thermal insulation external tube 122 are, for example, stainless-steel corrugated tubes (waved tubes). A multilayer thermal insulation layer (super insulation) 123, for example, formed of a layered body of a polyethylene film on which aluminum is deposited is interposed between the thermal insulation internal tube 121 and the thermal insulation external tube 122, and the space between the thermal insulation internal tube 121 and the thermal insulation external tube 122 is maintained under vacuum. The outer periphery of the thermal insulation external tube 122 is covered with a corrosion-proof layer 124 such as polyvinyl chloride (PVC) or polyethylene.

Further, the cable core 11 is inserted and the refrigerant is circulated in the thermal insulation internal tube 121. In other words, the interior region of the thermal insulation internal tube 121 is a refrigerant flowing pathway of the superconducting cable 10.

[Intermediate Fixation Portion: As a Whole]

Figure 3:
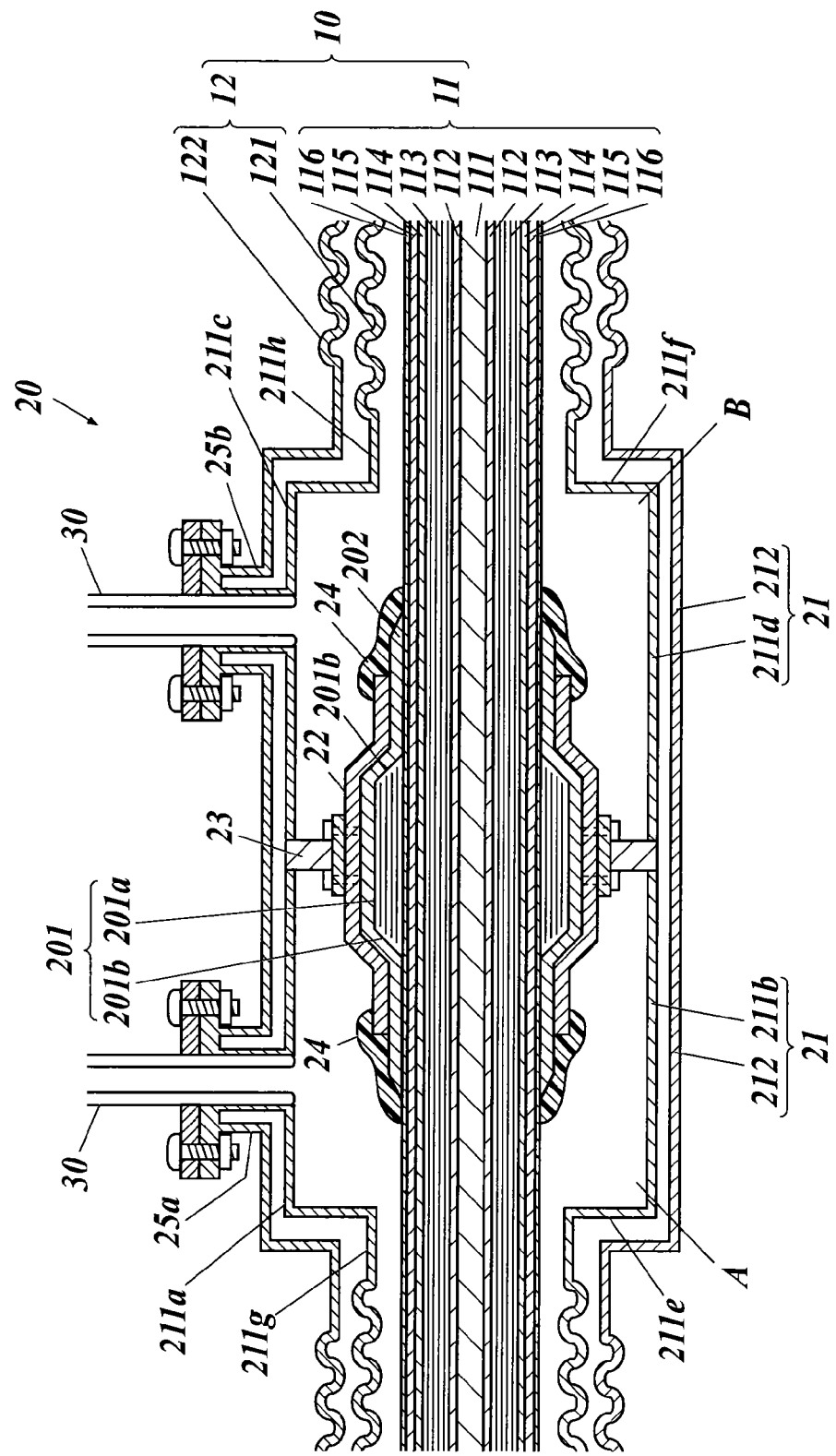
FIG. 3 is a cross sectional view for illustrating a fixation structure of two superconducting cables at an intermediate fixation portion.

FIG. 3 is a cross sectional view for illustrating a fixation structure of the superconducting cable 10 at the intermediate fixation portion 20. The intermediate fixation portion 20 includes a cylindrical fixation box 21 in which the superconducting cable 10 is housed and a fixation body for holding the superconducting cable 10 at the inside of fixation box 21. The fixation body includes a fixation block 22 working as a sleeve for holding the superconducting cable 10 therein and a fixing bracket 23 for fixing the fixation block 22 in the fixation box 21.

Further, in the fixation box 21, refrigerant flowing holes 25a and 25b are placed at both sides with respect to the fixing bracket 23 positioned at the center in the longitudinal direction of the cable line.

[Intermediate Fixation Portion: Fixation Box]

The fixation box 21 is fixedly placed at a position where the intermediate fixation portion 20 is to be placed on the installation pathway of the superconducting cable.

An end of the thermal insulation tube 12 of the superconducting cable 10 is welded and connected to respective end portion of the fixation box 21. At the wall surface of the end portion connected to each of the thermal insulation tubes 12, a liquid refrigerant (for example, liquid nitrogen) for cooling the cable core 11 is circulated in the interior region of the thermal insulation internal tube 121 and the interior circulation region of the fixation box 21. The liquid refrigerant is circulated between the thermal insulation internal tube 121 and the fixation box 21 (technically, the inside of an inner wall 211 described below) of the superconducting cable 10.

The fixation box 21 has a double wall surface structure including cylindrical inner wall 211 and outer wall 212.

Figure 4:
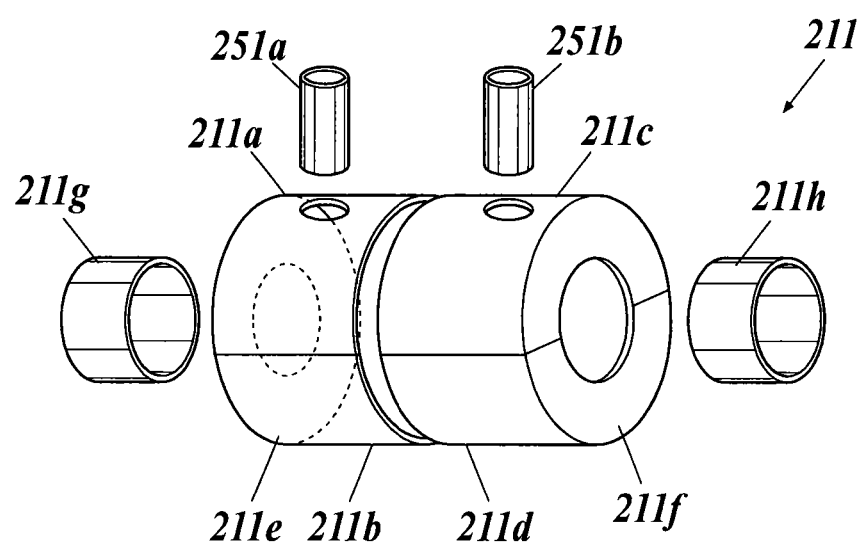
FIG. 4 is an exploded perspective view of an inner wall of a fixation box at the intermediate fixation portion.

As illustrated in FIG. 4, the inner wall 211 is formed by four wall surface members 211a to 211d that are obtained by dividing the cylindrical portion into two by the longitudinal direction of the cable (hereinafter, referred to as a cable direction) and further dividing the divided cylindrical portions into two at the torn surface along the cable direction. Note that the fixing bracket 23 described below is interposed between the two cylindrical portions each formed by the wall surface members 211a and 211b and the wall surface members 211c and 211d, respectively. All of the wall surface members 211a to 211d and the fixing bracket 23 are welded and integrated with each other.

Both ends of the inner wall 211 in the cable direction are blocked by end wall surfaces 211e and 211f. A through hole for inserting the cable core 11 is formed at the center of the end wall surfaces 211e and 211f, respectively. The thermal insulation internal tube 121 of the thermal insulation tube 12 of the superconducting cable 10 is connected to the through hole through straight tubes 211g and 211h, respectively. Note that all of the wall surface members 211a to 211d, the end wall surfaces 211e and 211f, the straight tubes 211g and 211h, and the thermal insulation internal tube 121 are also welded with each other.

Through holes for flowing the refrigerant to the inside of the inner wall 211 are formed at the upper sides of the wall surface members 211a and 211c. Internal tubes 251a and 251b that form the refrigerant flowing holes 25a and 25b are welded and connected to the through holes, respectively.

Figure 5:
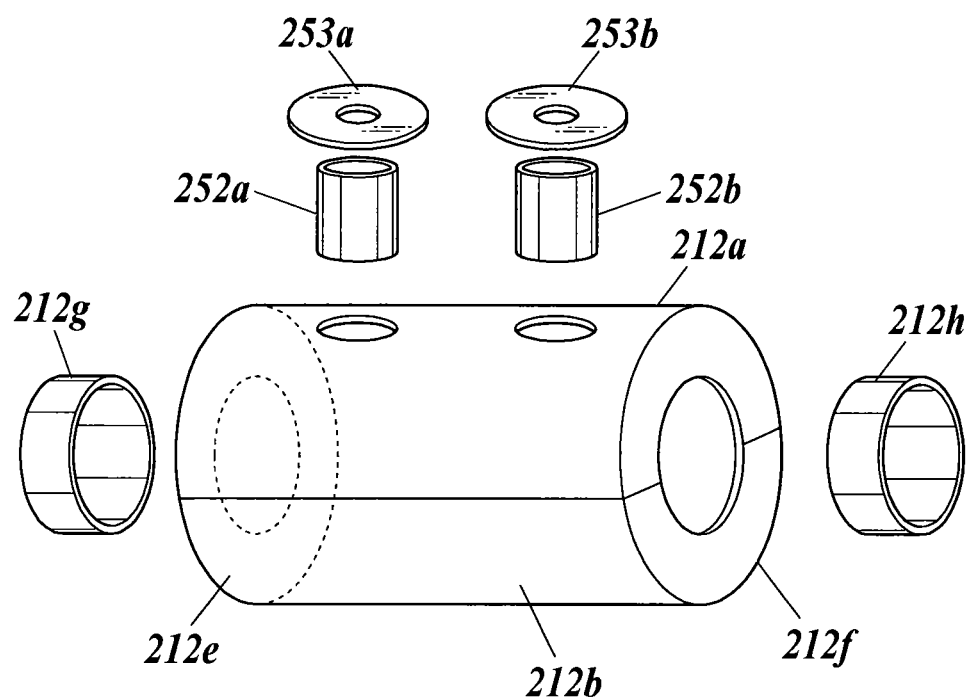
FIG. 5 is an exploded perspective view of an outer wall of a fixation box at the intermediate fixation portion.

The outer wall 212 internally houses the whole of the inner wall 211. As illustrated in FIG. 5, the outer wall 212 is formed by wall surface members 212a and 212b that have been obtained by dividing the cylindrical portion in the cable direction at the torn surface along the cable direction. Note that the inside diameter of the outer wall 212 is larger than the outside diameter of the inner wall 211. The length in the cable direction of the outer wall 212 is longer than the length in the cable direction of the inner wall 211. Thus, the outer wall 212 can completely house the inner wall 211 at the inside. Note that the wall surface members 212a and 211b are welded and integrated with each other.

Further, both ends of the outer wall 212 in the longitudinal direction of the cable are blocked by end wall surfaces 212e and 212f. A through hole for inserting the cable core 11 is formed at the center of the end wall surfaces 212e and 212f, respectively. The thermal insulation external tube 122 of the thermal insulation tube 12 of the superconducting cable 10 is connected to the through hole through straight tubes 212g and 212h, respectively. Note that all of the wall surface members 212a and 212b, the end wall surfaces 212e and 212f, the straight tubes 212g and 212h, and the thermal insulation external tube 122 are also welded with each other.

Further, two through holes for flowing the refrigerant to the inside of the inner wall 211 housed in the outer wall 212 are formed at the upper side of the wall surface member 212a in parallel to each other in line in the cable direction. External tubes 252a and 252b that form the refrigerant flowing holes 25a and 25b, respectively, are welded and connected to the through holes, respectively.

As described above, the outer wall 212 internally houses the inner wall 211. This forms a double wall structure having the outer wall 212 and the inner wall 211. The evacuation of the region between the outer wall 212 and the inner wall 211 is performed in order to form a thermal insulation structure.

Note that the interior region between the thermal insulation internal tube 121 and the thermal insulation external tube 122 of the superconducting cable 10 also has a thermal insulation structure under vacuum condition. The interior region of the thermal insulation tube 12 and the interior region of the double wall surfaces of the fixation box 21 can be evacuated at the same time by connecting the interior regions with each other.

Figure 6:
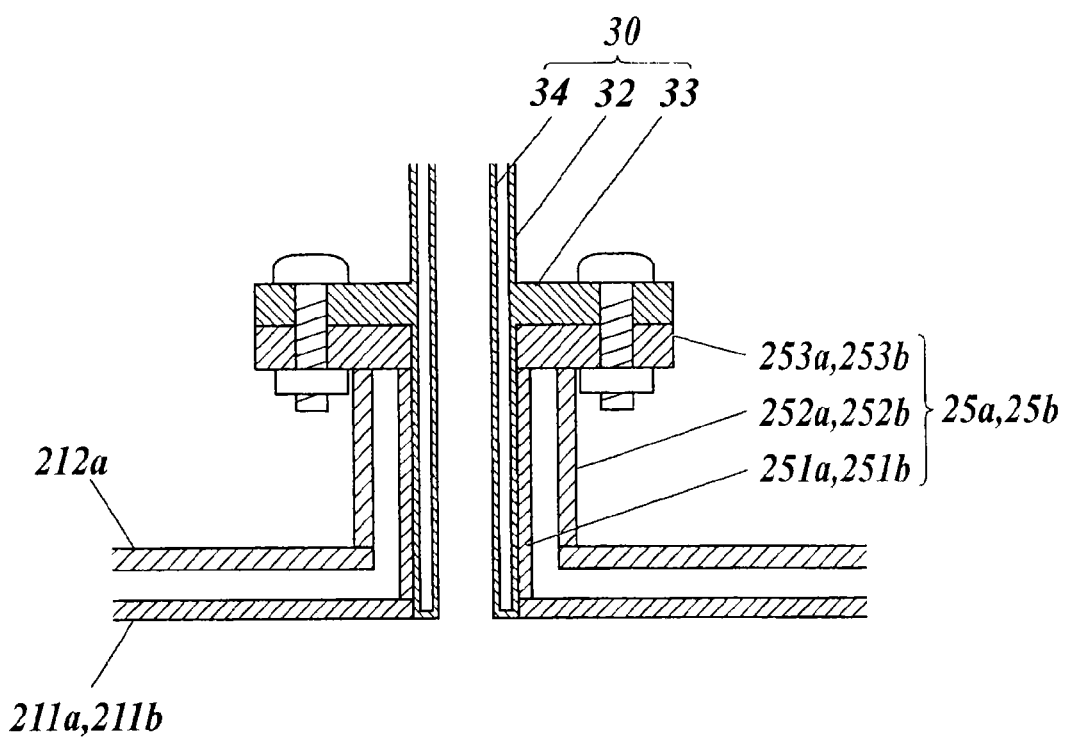
FIG. 6 is an enlarged sectional view of a refrigerant flowing hole.

As illustrated in FIG. 6, the refrigerant flowing hole 25a (25b) includes the above-mentioned internal tube 251a (251b), the external tube 252a (252b) into which the internal tube 251a (251b) is inserted, and a circular plate 253a (253b) that is welded and bonded to the upper ends or both of the internal tube 251a (251b) and the external tube 252a (252b) in order to seal the gap between the internal tube 251a (251b) and the external tube 252a (252b).

The circular plate 253a (253b) has the outside diameter larger than the external tube 252a (252b). A through hole having the same diameter as the inside diameter of the internal tube 251a (251b) is formed at the center of the circular plate 253a (253b) in order to flow the refrigerant through the through hole and the internal tube 251a (251b).

A refrigerant transporting tube 30 is inserted and connected to the internal tube 251a (251b) of the refrigerant flowing hole 25a (25b). The refrigerant transporting tube 30 has a double structure having an internal tube 34 and an external tube 32, and the inserted end is sealed. The clearance space between the internal tube 34 and the external tube 32 is evacuated in order to form a thermal insulation structure.

A flange portion 33 is formed near the inserted end of the refrigerant transporting tube 30. The flange portion 33 has the outside diameter approximately identical to the circular plate 253a (253b) of the above-mentioned refrigerant flowing hole 25a (25b). The flange portion 33 and the circular plate 253a (253b) are bolted and connected to each other.

A seal member such as an O-ring can be inserted between the internal tube 251a (251b) and the refrigerant transporting tube 30.

The end of a tube is a portion at which the heat invasion easily occurs. However, each of the refrigerant flowing hole 25a (25b) and the refrigerant transporting tube 30 has a double tube structure. The gap of the double tube structure is evacuated and has a thermal insulation structure. Further, the refrigerant flowing hole 25a (25b) and the refrigerant transporting tube 30 form a connected structure where one is inserted into the other. Thus, the heat invasion is prevented so that the increase in temperature of the internal refrigerant can effectively be prevented.

[Intermediate Fixation Portion: Fixation Block]

As illustrated in FIG. 3, a diameter-expanded reinforcement layer 201 is formed at the cable core 11 of the superconducting cable 10 that is fixed by the fixation body. The diameter-expanded reinforcement layer 201 is layered by winding a kind of insulating papers around the surface of the protection layer 116 that is the outermost layer of the cable core 11. The diameter-expanded reinforcement layer 201 includes an isodiametric portion 201a that has an outside diameter maintained at a fixed size and is formed at the center in the cable direction, and tapered portions 201b, formed at both ends, that has the diameters gradually reducing with distance from the center and becoming the same as the diameter of the cable core 11. The kind of insulating papers is tightly wound in order not to cause the slippage of the diameter-expanded reinforcement layer 201 along the cable core 11.

A reinforcement layer 202 is formed at the outer periphery surface of the diameter-expanded reinforcement layer 201 by winding a plated copper wire in a layered state. The reinforcement layer 202 can be formed by winding and layering a copper braided wire.

A diameter expansion portion is formed at the outer periphery portion of the reinforcement layer 202. The diameter expansion portion includes tapers at both ends according to the shape of the lower diameter-expanded reinforcement layer 201.

The fixation block 22 of the fixation body has a cylindrical shape and maintains the cable core 11 through the diameter-expanded reinforcement layer 201 and the reinforcement layer 202 while the cable core 11 is inserted into them.

The reinforcement layer 202 is formed within approximately the same range as the range maintained by the fixation block 22 in the cable direction. The reinforcement layer 202 works as a buffer when the fixation block 22 maintains the cable core 11 of the superconducting cable 10 because the reinforcement layer 202 is a plated copper wire layer or a copper braided wire layer having a predetermined thickness and being wound. The reinforcement layer 202 can maintain the cable core 11 when the cable core 11 is expanded/contracted due to temperature changes.

The fixation block 22 is formed into an approximately cylindrical shape where the diameter reduces at both ends of the external shape in the longitudinal direction of the cable. Further, a convex portion is formed at the inside of the fixation block 22 such that the external shape of the diameter-expanded portion of the reinforcement layer 202 which is expanded by the diameter-expanded reinforcement layer 201 is fitted to the convex portion. The convex portion can wrap and maintain the diameter-expanded reinforcement layer 201 and the reinforcement layer 202 while they are fitted in the fixation block 22.

The fixation block 22 wraps and maintains the cable core 11 by holding the cable core 11 with the semicircular members that have been obtained by dividing the fixation block 22 into two at the cross sectional surface along the center line. The semicircular members are welded and integrated with each other. As described above, the fixation block 22 has a divided structure, so that the fixation block 22 can easily be attached to the cable core 11.

In this holding state, thermosetting resins 24 working as connection portions are applied at both ends of the fixation block 22 within the range covering both ends of the reinforcement layer 202 and to the cable core 11 in order to fix the cable core 11 to the fixation block 22.

The reinforcement layer 202 may be formed within the range of the fixation block 22 so that the thermosetting resin 24 can directly fix the fixation block 22 and the cable core 11.

A fiber-reinforced plastic (FRP) that is a mixture of a reinforcement fiber such as a glass fiber and a thermosetting resin such as an epoxy resin can be used as the thermosetting resin 24.

[Intermediate Fixation Portion: Fixing Bracket]

The fixing bracket 23 is bolted and fixed on the outer periphery surface of the fixation block 22 and at the midpoint in the cable direction. The fixing bracket 23 is formed into a flange shape extending in a radial direction of which center is the cable core 11. The outside diameter of the fixing bracket 23 is set larger than the outside diameter of the inner wall 211 of the fixation box 21 and smaller than the inside diameter of the outer wall 212. As described above, the fixing bracket 23 is sandwiched and welded by the cylinders which are formed by dividing the inner wall 211. Thus, the fixing bracket 23 can maintain the cable core 11 from all directions.

The fixing bracket 23 is formed by two semicircular members obtained by dividing the fixing bracket 23 into two at the cross sectional surface along the center line similarly to the fixation block 22. When the fixing bracket 23 is attached to the outer periphery surface of the fixation block 22, the two semicircular fixing bracket members are welded and integrated with each other.

The interior region of the inner wall 211 of the fixation box 21 is divided into a space A and a space B by the fixing bracket 23. Thus, the refrigerant cannot directly flow from the space A to the space B in the fixation box 21. However, for example, the refrigerant flowing in from the thermal insulation tube 12 of the superconducting cable 10 connected to the space A side passes through the space A by flowing out through the refrigerant flowing hole 25a (or, from the refrigerant flowing hole 25a to the thermal insulation tube 12), and the refrigerant flowing in from the thermal insulation tube 12 of the superconducting cable 10 connected to the space B side passes through the space B by flowing out through the refrigerant flowing hole 25b (or, from the refrigerant flowing hole 25b to the thermal insulation tube 12).

[Intermediate Fixation Portion: Functional Effect]

At the intermediate fixation portion 20 of the superconducting cable 10, the inner wall 211 and the outer wall 212 of the fixation box 21 are bonded by the circular plate 253a and 253b of the refrigerant flowing holes 25a and 25b and the fixing bracket 23 is provided in order to fix the superconducting cable 10 and the inner wall 211 of the fixation box 21. Thus, the cable core 11 can firmly be fixed in all directions centering on the cable core 11 only by fixing the outer wall 212 of the fixation box 21 or the thermal insulation external tube 122 of the thermal insulation tube 12. Further, the fixation box 21 includes the refrigerant flowing holes 25a and 25b. Thus, even though the interior region of the inner wall 211 is divided into the space A and the space B by the fixing bracket 23 and the communication of the refrigerant between the spaces is interrupted, the communication can be secured through the refrigerant flowing holes 25a and 25b.

Further, it is not necessary to directly maintain the high-voltage conductor portion (the former 111 and the superconductor layer 112) because the protection layer 116 of the cable core 11 is maintained by the fixation body. Thus, the concentration of the electric field hardly occurs on the creepage surface between case portions grounded from the high-voltage conductor portion. In other words, a complicated electrical insulation design (electric field design) is not necessary.

Further, bonding of the inner wall 211 and the outer wall 212 of the fixation box 21 with the circular plate 253a and 253b of the refrigerant flowing holes 25a and 25b minimizes the bonded portion. Thus, the heat invasion from the bonded portion to the inside can be reduced.

[Other Examples of Fixation Box]

Figure 7:
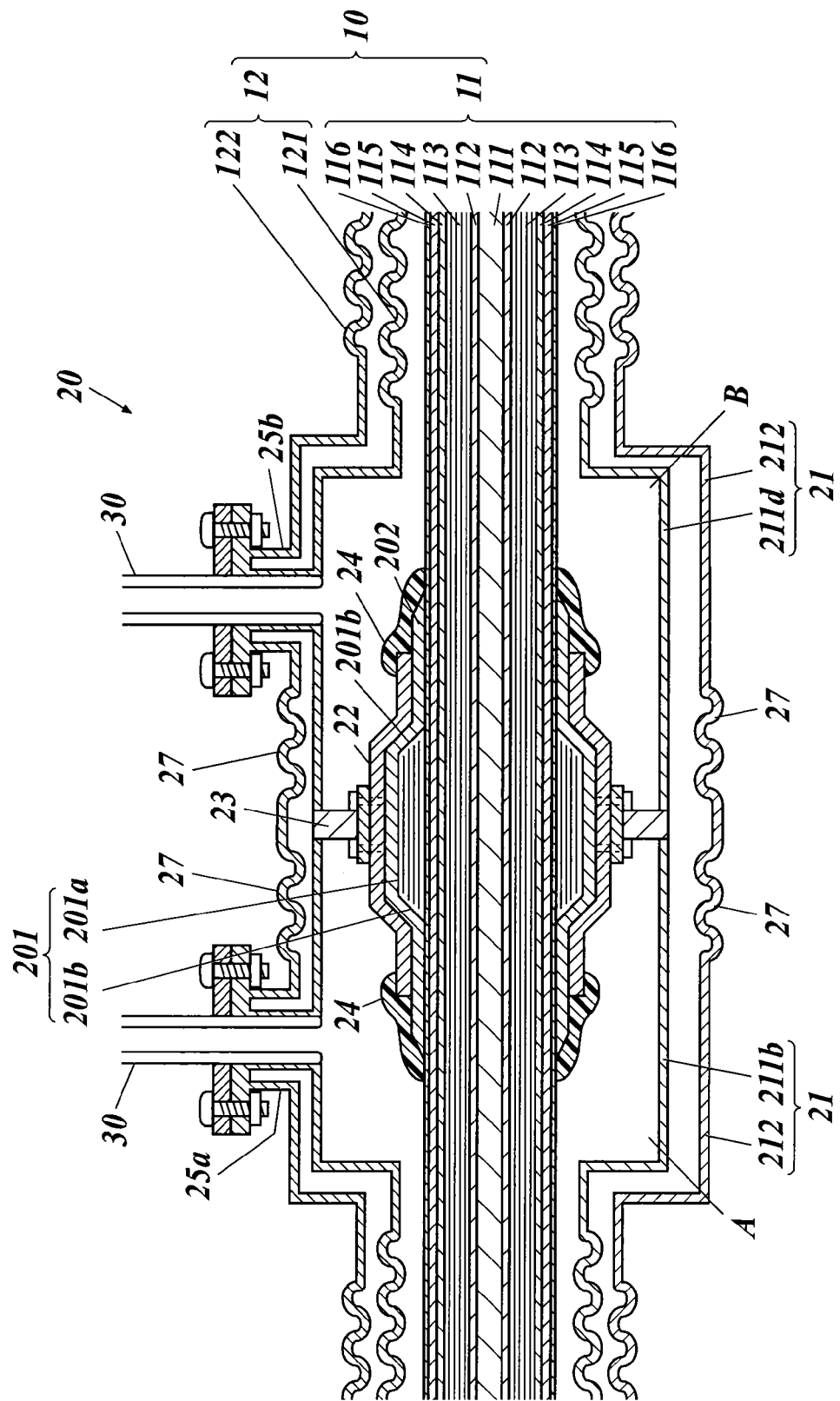
FIG. 7 is a cross sectional view for illustrating an exemplary intermediate fixation portion in which a bellows structure is provided at the fixation box.

FIG. 7 shows an example where a bellows structure 27 is provided at a fixation box 21. As illustrated in the drawing, the bellows structure 27 is provided at the outer wall 212 of the fixation box 21 and can also be provided at two refrigerant flowing holes 25a and 25b. Although two bellows structures 27 are formed in the example, the bellows structures can be integrated.

The bellows structure 27 is a concertina shape portion that is formed all around the cylindrical outer wall 212. The bellows structure 27 allows the deformation that expands and contracts the outer wall 212 in the cable direction or the deformation in the direction which the cable core 11 deforms.

Thus, even though the deformation, the expansion and contraction, or the like, for example, due to a thermal expansion and contraction occurs at the thermal insulation tube 12 and the cable core 11 of the superconducting cable 10, the cable core 11 can be maintained while the deformation is allowed.

The bellows structure 27 can be provided not only at the outer wall 212 but also at the inner wall 211.

[Three-Phase Superconducting Cable]

Figure 8:
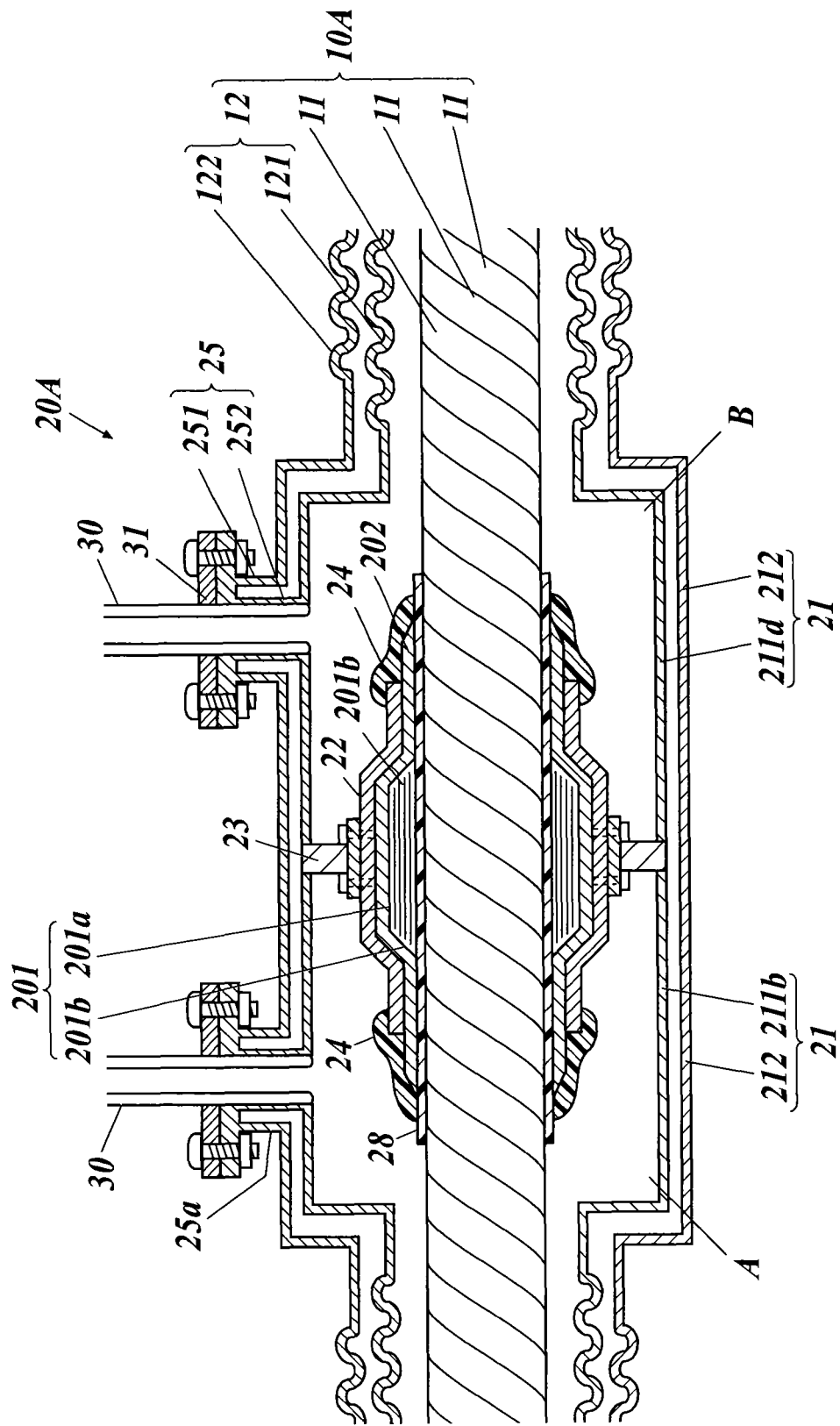
FIG. 8 is a cross sectional view for illustrating an exemplary intermediate fixation portion that fixes a three-phase superconducting cable.

FIG. 8 shows an intermediate fixation portion 20A of a three-phase superconducting cable 10A.

In the three-phase superconducting cable 10A, a spiral strand of three cable cores 11 is housed in the thermal insulation tube 12.

The intermediate fixation portion 20A maintains the stranded cable cores 11A as well as the one cable core 11. Specifically, in the intermediate fixation portion 20A, the surface of the stranded cable cores 11A is coated with a mixture (fiber-reinforced plastic: FRP) layer 28 of a reinforcement fiber such as a glass fiber and a thermosetting resin such as an epoxy resin. A diameter-expanded reinforcement layer 201 and a reinforcement layer 202 are formed on the mixture layer 28 and then are maintained by a fixation body. The structure other than the mixture layer 28 is the same as the structure of the above-mentioned intermediate fixation portion 20.

According to the intermediate fixation portion 20A, the three-phase superconducting cable 10A can be fixed while having the same effect as the superconducting cable 10.

The number of the cable cores 11 is not limited to three. A superconducting cable having two, four or more cables in different phases can also be fixed by the above-mentioned intermediate fixation portion 20A effectively.

[Example of Connection Between Two Refrigerant Communication Holes]

Figure 9:
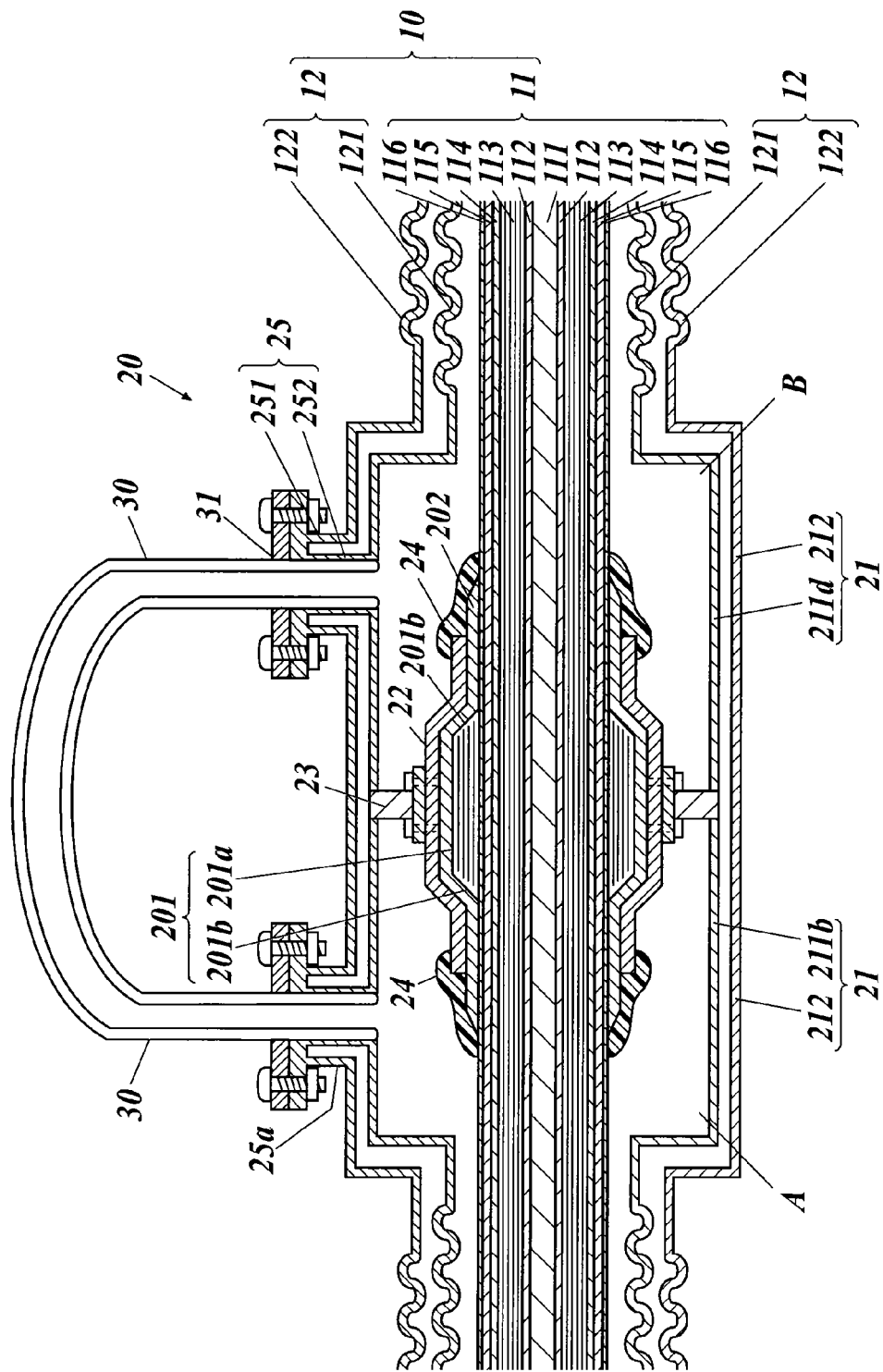
FIG. 9 is a cross sectional view for illustrating an exemplary intermediate fixation portion in which a refrigerant transporting tube connects two refrigerant flowing holes.

As illustrated in FIG. 9, the above-mentioned refrigerant flowing holes 25a and 25b of the fixation box 21 can be connected by the refrigerant transporting tube 30 so that the refrigerant is mutually circulated between the holes. Accordingly, the refrigerant that has flown in the space A inside the inner wall 211 of the fixation box 21 moves to the space B through the refrigerant transporting tube 30, or the refrigerant that has flown in the space B moves to the space A. Thus, the refrigerant can flow between the space A and the space B in the fixation box 21.

Figure 10:
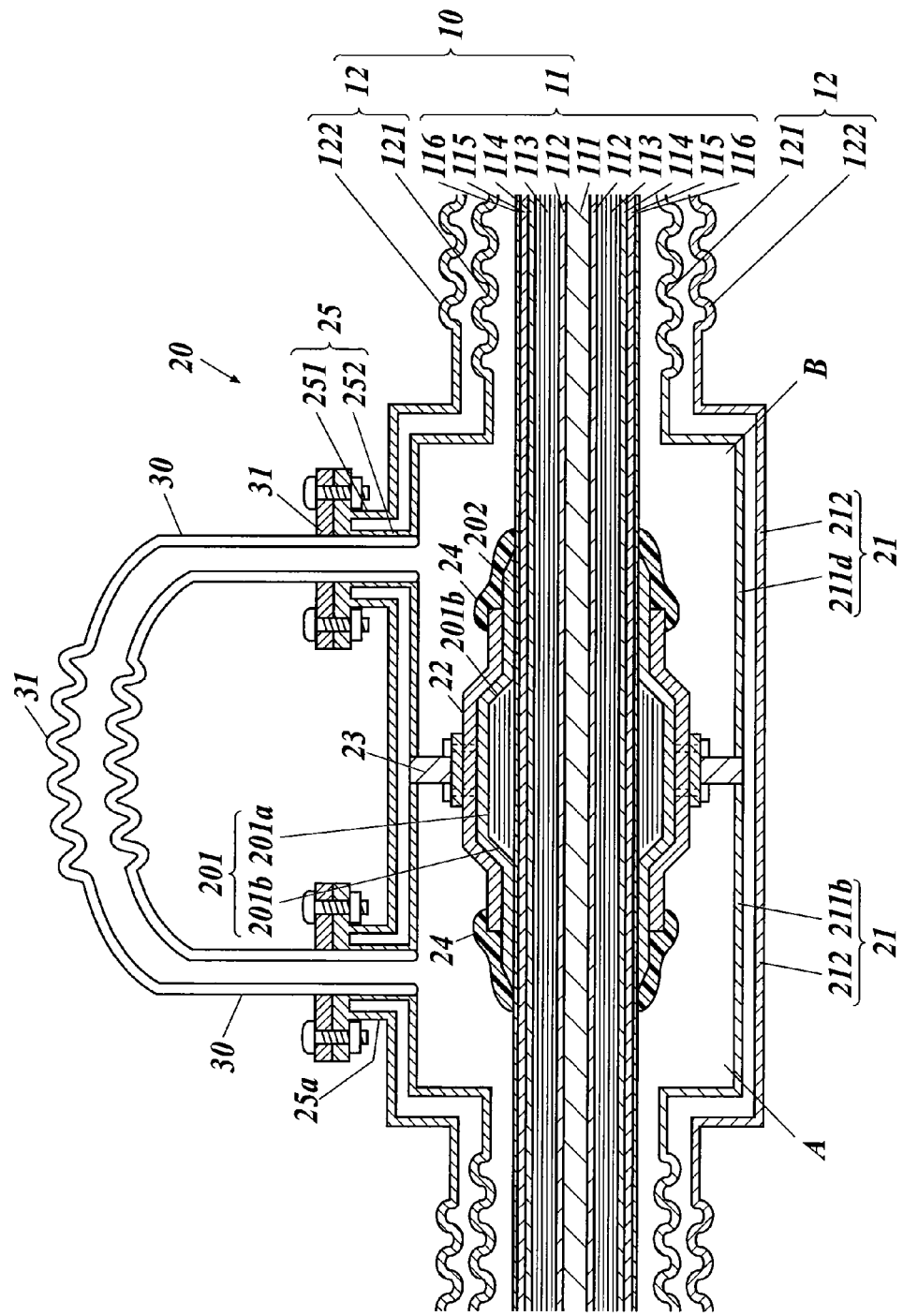
FIG. 10 is a cross sectional view for illustrating an example where a bellows structure is provided at the refrigerant transporting tube.

As illustrated in FIG. 10, a concertina-shape bellows portion 31 can be formed at a midpoint of the refrigerant transporting tube 30. Thus, the bellows portion 31 of the refrigerant transporting tube 30 can allow the deformation of the fixation box 21 and favorable flowing of the refrigerant can be secured. When being formed at the outer wall 212 of the fixation box 21 as described above, the bellows portion 31 of the refrigerant transporting tube 30 can especially effectively accept the deformation of the outer wall 212.

[Example of Fixation Box Having More Refrigerant Communication Holes]

Although the above-mentioned intermediate fixation portion 20 is described as an example where two refrigerant flowing holes 25a and 25b are provided at the upper portion of the fixation box 21, the number of the refrigerant flowing holes is not limited to two. More refrigerant flowing holes can be provided at the fixation box 21. For example, in an intermediate fixation portion 20B illustrated in FIG. 11, two refrigerant flowing holes 25c and 25d are also provided at the lower portion of the fixation box 21B.

Similarly to the two refrigerant flowing holes 25a and 25b, the refrigerant flowing holes 25c and 25d are connected to a space A and the other space B, respectively, which a fixing bracket 23 of an inner wall 211 is interposed therebetween.

Figure 11:
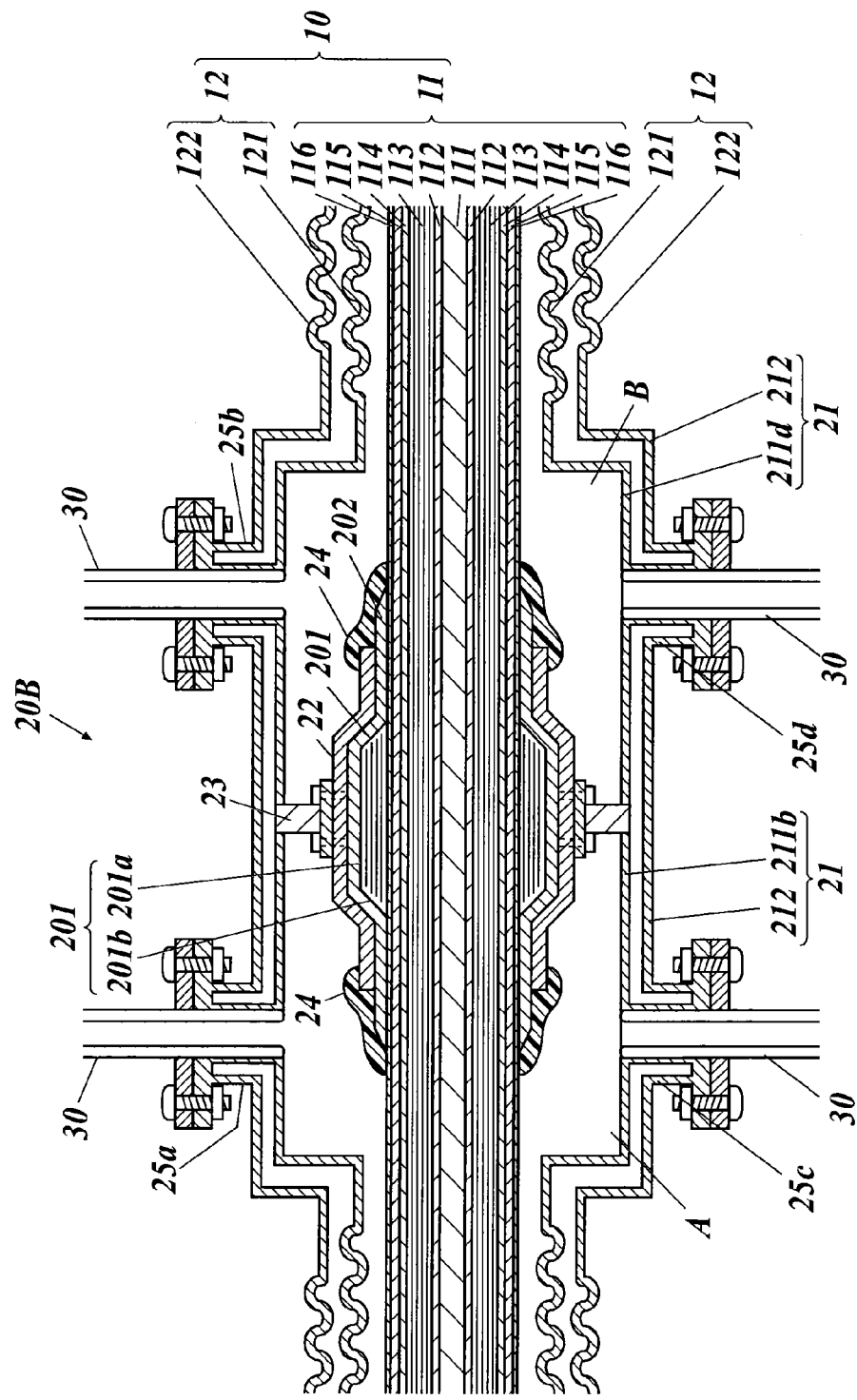
FIG. 11 is a cross sectional view for illustrating an exemplary intermediate fixation portion in which four refrigerant flowing holes are provided at the fixation box.
Figure 12:
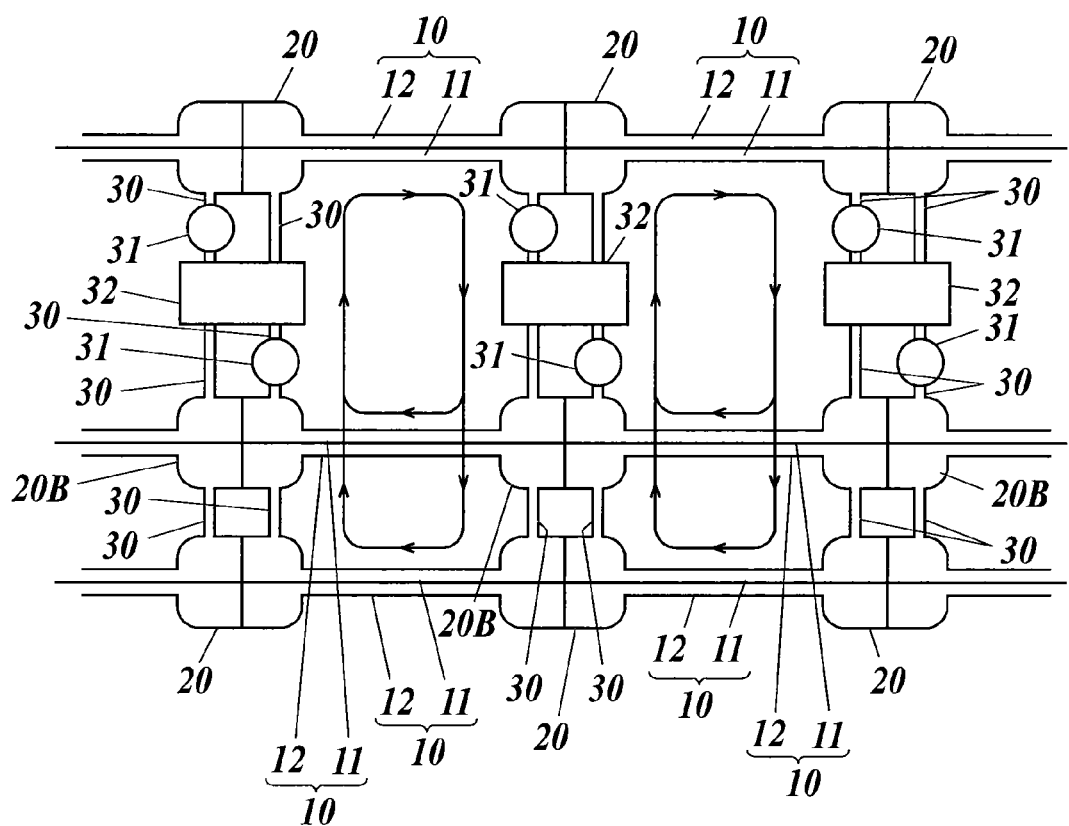
FIG. 12 is a schematic structure view for illustrating an example when an intermediate fixation portion including two refrigerant flowing holes and an intermediate fixation portion including four refrigerant flowing holes are applied to an installation site of a superconducting cable.

FIG. 12 illustrates an example of a fixation structure of a superconducting cable line in which three superconducting cables 10 are fixed using the intermediate fixation portion 20 illustrated in FIG. 3 and the intermediate fixation portion 20B illustrated in FIG. 11.

The three superconducting cables 10 are installed in parallel to each other. In the example of FIG. 1, the refrigerant flows along the superconducting cable 10. However, when the plurality of superconducting cables 10 are installed in parallel to each other as illustrated in FIG. 12, intermediate fixation portions 20 (or 20B) adjacent to each other along each of the superconducting cables 10 may be connected and intermediate fixation portions 20 (or 20B) adjacent to each other along the direction in which the superconducting cables 10 are arranged in parallel may be connected so that the refrigerant pathway of the refrigerant can be formed into a net pattern.

For example, the intermediate fixation portions 20 are placed in two superconducting cables 10 on outer sides at predetermined intervals and the intermediate fixation portions 20B are placed, at the same intervals, on the superconducting cable 10 positioned between the two superconducting cables 10. The intermediate fixation portions 20 (or 20B) adjacent in the direction which the superconducting cables 10 are arranged in parallel are connected to each other with the two refrigerant transporting tubes 30. At that time, because the intermediate fixation portion 20B is connected to both of the adjacent intermediate fixation portions 20, the two refrigerant flowing holes 25a and 25b positioned at the upper side of the intermediate fixation portion 20B are connected to the refrigerant flowing holes 25a and 25b of an external intermediate fixation portion 20 through the refrigerant transporting tubes 30, and the two refrigerant flowing holes 25c and 25d positioned at the lower side of the intermediate fixation portion 20B are connected to the refrigerant flowing holes 25a and 25b of the other external intermediate fixation portion 20 through the refrigerant transporting tubes 30.

A circulation pump 31 for circulating the refrigerant in a predetermined direction and a refrigerator 32 for cooling the refrigerant are placed between an intermediate fixation portion 20 and the intermediate fixation portion 20B.

As described above, the refrigerant pathways in a predetermined direction are formed as net patterns in the six intermediate fixation portions 20 and 20B provided on the three superconducting cables 10 and adjacent to each other.

When a plurality of the superconducting cables 10 are fixed, it is not necessary to connect the intermediate fixation portions 20 to each other, but the intermediate connecting portion 20 at which the refrigerant transporting tube connects the two refrigerant flowing holes (FIGS. 9 and 10) can be used.

[Intermediate Fixation Portion Having Intermediate Connecting Portion]

Each of the above-mentioned intermediate fixation portions 20, 20A and 20B fixes a portion that does not include an intermediate connecting portion of the cable core 11. However, an intermediate fixation portion 20C having the same structure as the intermediate fixation portion 20 or the like can be used for fixing the intermediate connecting portion 15 in a case where the intermediate connecting portion 15 for connecting the cable cores 11 in a longitudinal direction is included in the intermediate fixation portion.

Figure 13:
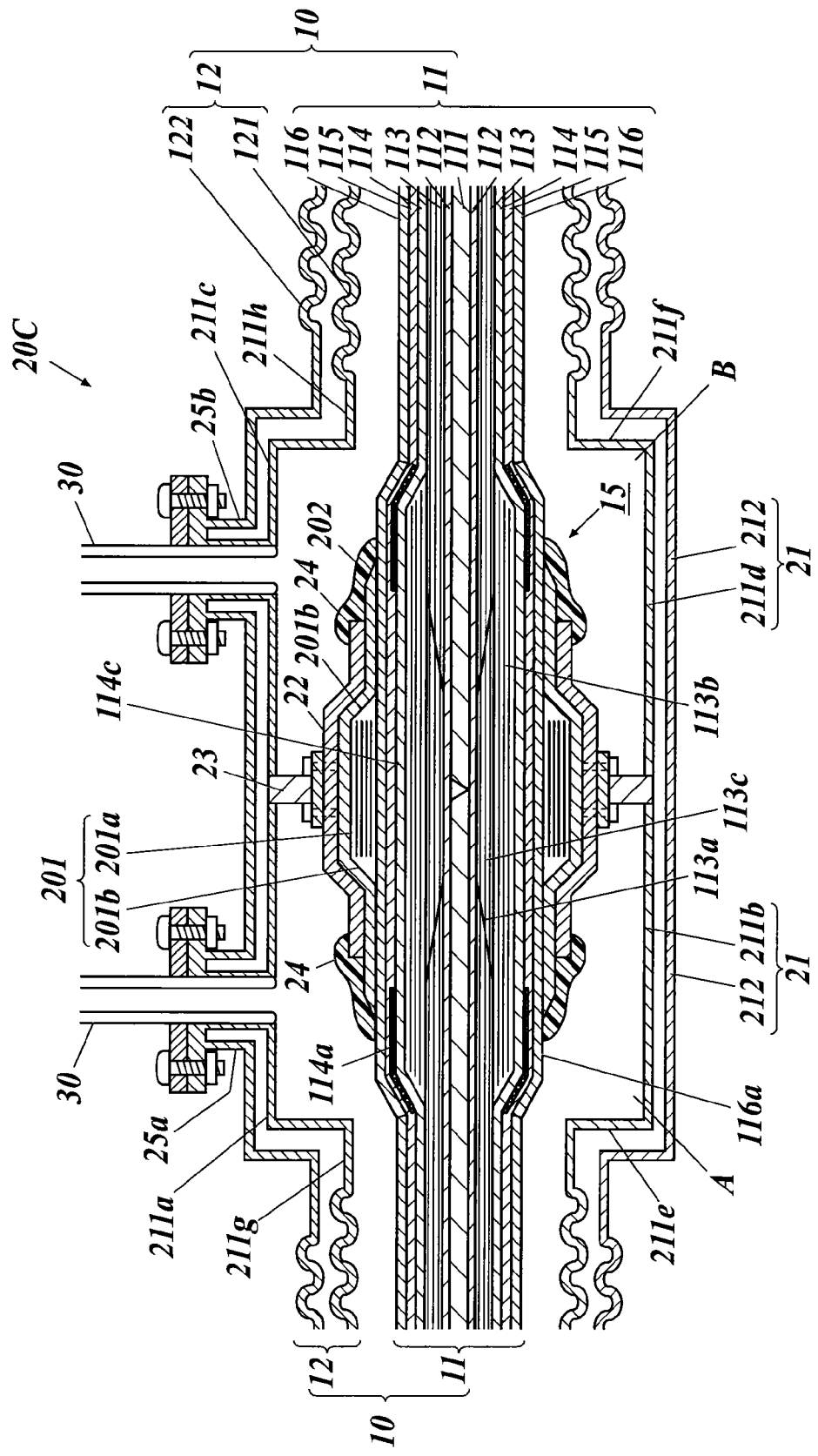
FIG. 13 is a cross sectional view for illustrating an exemplary intermediate fixation portion including an intermediate connecting portion.

FIG. 13 illustrates the intermediate fixation portion 20C including the intermediate connecting portion 15 of two superconducting cables 10.

The two superconducting cables 10 are connected as described below.

Specifically, the cable core 11 is exposed from the connection end of each of the superconducting cables 10 at a certain length from the thermal insulation tube 12. Further, each of the electrical insulation layer 113, the superconducting shield layer 114, the normal conduction shield layer 115, and the protection layer 116 is removed in order to cause the former 111 and the superconductor layer 112 to project toward the connection end side at a predetermined length. At the time, only the electrical insulation layer 113 formed of a layered insulating paper, for example, is formed into a shape at the connection ends whose diameter reduces toward the connection end so as to form tapers 113a at the connection end.

After that, the formers 111 face to each other and the connection ends are welded. The welded portion between the formers 111 is shaped to maintain the outside diameter constant. The superconductor layer 112 that has been removed backward is re-wound on the former 111.

A connecting superconducting wire material (not illustrated in the drawings) is attached via a solder on the upper surface of the connection end of the two superconductor layers 112 in order to bring the superconducting layers of the superconductor layers 112 into conduction. Note that the superconducting wire material forming the superconducting layer of the superconductor layers 112 can be connected with a solder one by one.

In the fixation structure of the superconducting cable 10 of an embodiment of the present invention, around the formers 111 and the superconductor layers 112 of the two superconducting cables 10 connected to each other as described above, a connecting electrical insulation layer 113c is formed as an electrical insulation layer by winding and layering the same kind of insulating papers as the electrical insulation layer 113. The connecting electrical insulation layer 113c is formed within the range that can cover at least all the portion of which diameter is reduced by the two tapers 113a opposing to each other. At that time, the kind of insulating papers is further wound after the connecting electrical insulation layer 113c is formed until the connecting electrical insulation layer 113c is larger than the outside diameter of the electrical insulation layer 113 in order to form a diameter-expanded reinforcement and electrical insulation layer 113b because it is necessary to more tightly insulate the connection of the superconductor layers 112 from the surroundings in comparison with the ordinary portions.

The width of the diameter-expanded reinforcement and electrical insulation layer 113b is formed large enough to cover both of the two splices that are boundaries between the two tapers 113a of the electrical insulation layer 113 and the connecting electrical insulation layer 113c.

Further, a connecting superconducting shield layer 114c is formed between two superconducting shield layers 114. A connecting superconducting wire material 114a is attached via a solder, in an installed state, on the upper surface of the connection end of the superconducting shield layer 114 and the connecting superconducting shield layer 114c in order to bring the both layers 114 and 114c into conduction, resulting in the superconducting shield layers 114 being electrically connected to each other. Note that each of the superconducting wire material forming the superconducting layer of the superconducting shield layer 114 and the superconducting wire material forming the superconducting layer of the connecting superconducting shield layer 114c can be connected with a solder one by one.

Further, it may be possible, without providing the connecting superconducting shield layer 114c, to attach the connecting superconducting wire material 114a via a solder, in an installed state, on the upper surface of the connection end of the superconducting shield layers 114 in order to bring the superconducting layer of the superconducting shield layers 114 into conduction so as to connect the superconducting shield layers 114 electrically. The superconducting wire material forming the superconducting layer of the superconducting shield layer 114 can be connected with a solder one by one.

After the superconducting shield layers 114 are connected to each other, a connecting normal conduction shield layer 115a is placed at the portion where the normal conduction shield layers 115 are not formed. The connection ends of each of the normal conduction shield layers 115 are connected to the connecting normal conduction shield layer 115a with solders so that the normal conduction shield layers 115 are connected to each other.

After the normal conduction shield layers 115 are connected to each other, the insulating paper, polymeric nonwoven fabric or the like which is common to the protection layer 116 is wound and layered at the portion where the protection layer 116 is not formed in order to form a connecting protection layer 116a.

As described above, the superconducting shield layer 114, the normal conduction shield layer 115, and the protection layer 116 that have initially been removed from each of the connection end of the superconducting cables 10 are sequentially formed on the outer periphery surface of the diameter-expanded reinforcement and electrical insulation layer 113b again.

The diameter-expanded reinforcement layer 201 is formed on the outer periphery surface of the reformed protection layer 116 by winding and layering a kind of insulating paper around the surface of the protection layer 116. The reinforcement layer 202 and the fixation block 22 of the fixation body are the same as the embodiment illustrated in FIG. 3.

In the present embodiment, to reduce damages at the connection of the superconducting shield layers 114, it is preferable that the connecting portion of the superconducting shield layers 114 (corresponding to the connecting portion between the connecting superconducting wire material 114a and the superconducting shield layer 114 and connecting superconducting shield layer 114c in FIG. 13) is not included in the portion wrapped and maintained by the fixation block 22 of the fixation body.

As described in the present embodiment, in the intermediate fixation portion 20C, when the intermediate connecting portion 15 that is formed when the superconducting cables 10 are connected in a longitudinal direction is combined with the intermediate fixation portion 20, it becomes possible to reduce the number of the fixation boxes 21 and the connection boxes and thus the heat invasion can be reduced.

The intermediate connecting portion 15 can prevent the concentration of the electric field and obtain high insulating capacity because the gap between the tapers 113a of the electrical insulation layers 113 opposing to each other at the connecting portion of the superconductor layers 112 is filled with the new electrical insulation layer 113c and the splices of both ends of the electrical insulation layer 113c are covered with the diameter-expanded reinforcement and electrical insulation layer 113b having a diameter larger than the electrical insulation layer 113.

Further, the intermediate fixation portion 20C can firmly fix the cable core and the superconducting cable 10 with a simple structure because the fixing bracket 23 supported on the inner wall 211 of the fixation box 21 wraps and maintains the intermediate connecting portion 15 from the outside with the sleeve-shape fixation block 22.

Further, the diameter-expanded reinforcement layer 201 of which diameter decreases toward both ends thereof is formed on the cable core 11 and is fixed by the fixation block 22 having a shape according to the shape of the outer periphery surface of the diameter-expanded reinforcement layer 201. This causes a structure having reduced corners and projections around the cable core 11 and at the fixation structure. Thus, the concentration of the electric field hardly occurs and the electric field design has a high insulating capacity.

Although the above-mentioned fixation box 21 has a cylindrical shape in the examples, the shape is not especially limited. For example, the shape can be a rectangular parallelepiped or the like.

In the intermediate fixation portion 20C only the intermediate connecting portion 15 is fixed from outside. However, a structure can be added to fix and maintain both ends or an end, along the longitudinal direction of the cable core 11, of the intermediate connecting portion 15 on the inner wall 211 of the fixation box 21 through the diameter-expanded reinforcement layer 201, the reinforcement layer 202, the fixation block 22 and the fixing bracket 23.

[Other Examples of Fixing Bracket]

In each of the intermediate fixation portions 20, 20A, 20B, and 20C, the cable core is fixed with a flange-shape fixing bracket 23. However, the shape, structure or the number of the fixing bracket is not limited to the embodiments.

Figure 14:
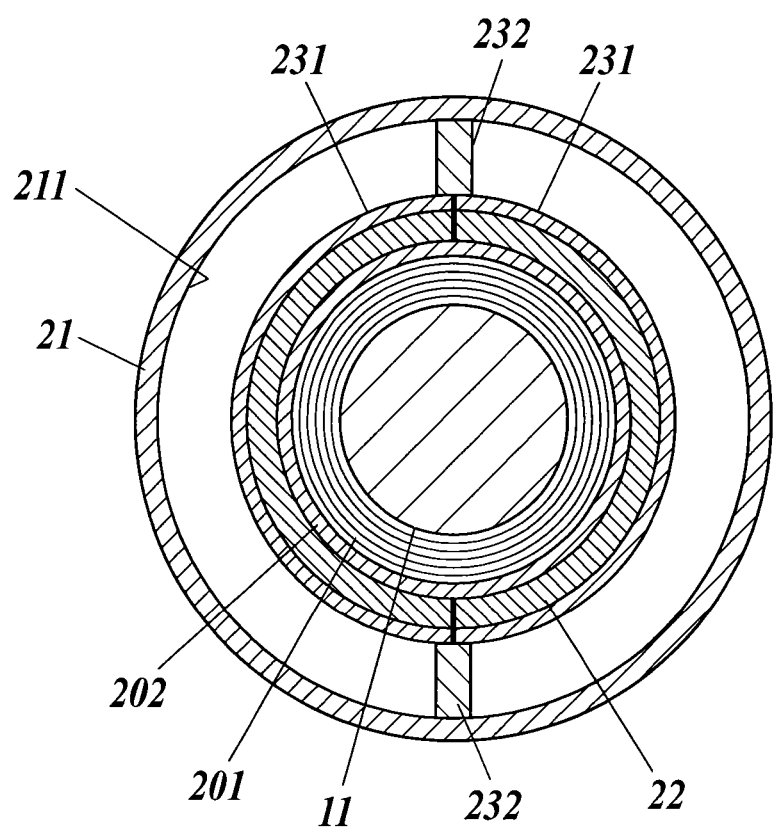
FIG. 14 is a cross sectional view from the view of the cross sectional surface perpendicular to a cable core at an intermediate fixation portion for illustrating another exemplary fixing bracket.

For example, FIG. 14 is a cross sectional view from the view of the cross sectional surface perpendicular to the cable core 11. As illustrated in the drawing, two pieces of a reinforcement metal ring 231 obtained by dividing the ring into two are fitted to each other, welded and fixed on the outer periphery surface at a middle position in the longitudinal direction of the fixation block 22. Two rod-shaped or block-shaped fixing brackets 232 are provided at circumferentially opposite positions of the metal ring 231 and both ends of the fixing brackets 232 are welded in order to fix the metal ring 231 and the inner wall 211 of the fixation box 21.

Figure 15:
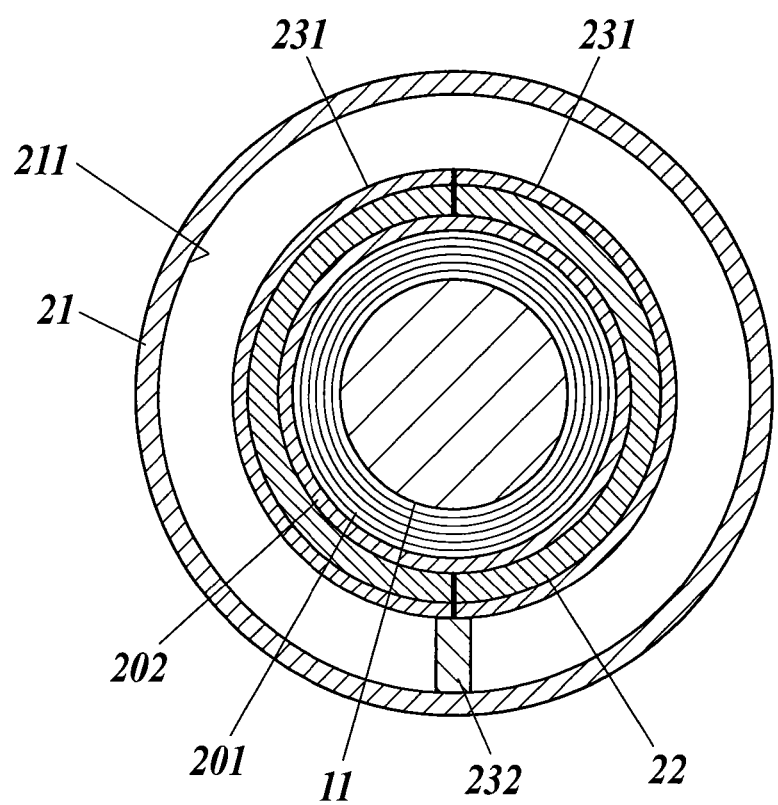
FIG. 15 is a cross sectional view from the view of the cross sectional surface perpendicular to a cable core at an intermediate fixation portion for illustrating another exemplary fixing bracket.
Figure 16:
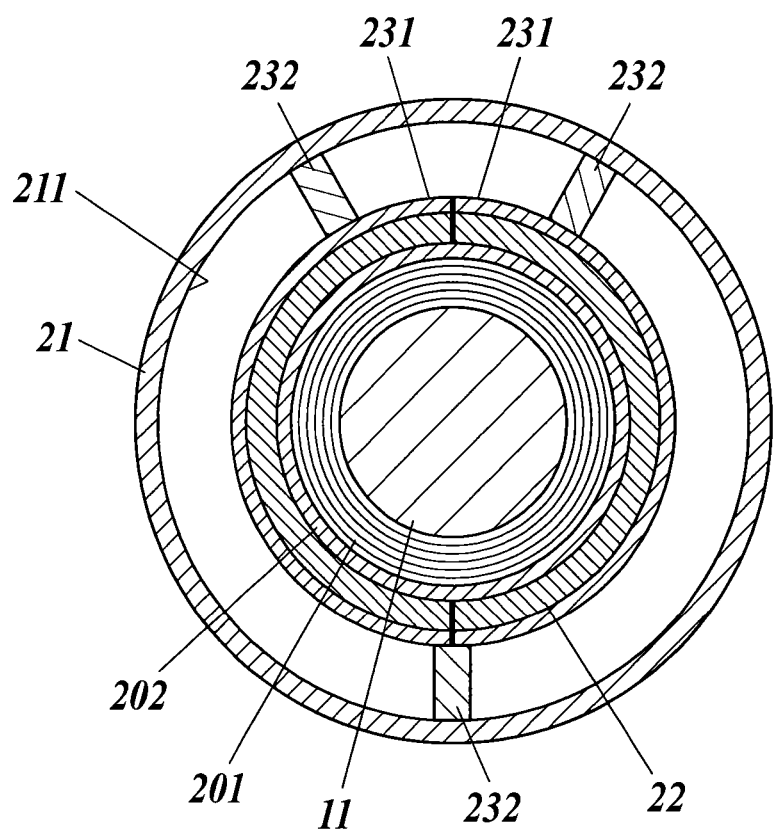
FIG. 16 is a cross sectional view from the view of the cross sectional surface perpendicular to a cable core at an intermediate fixation portion for illustrating another exemplary fixing bracket.

If the strength of the fixation can sufficiently be secured, only one fixing bracket 232 may be provided as illustrated in FIG. 15. For more strong fixation, more fixing brackets 232 (three in the example of FIG. 16) can be used for fixation as illustrated in FIG. 16.

A portion other than the intermediate connecting portion 15 of the cable core 11 can be fixed on the inner wall 211 of the fixation box 21 with an auxiliary fixture combined with the above-mentioned fixation body. The auxiliary fixture is configured of a metal ring that is directly attached to the outer periphery of the portion other than the intermediate connecting portion 15 of the cable core 11 and is for maintaining the cable core (the same structure as the metal ring 231) and one or a plurality of rod-shaped or block-shaped fixing brackets for fixing the metal ring and the inner wall 211 of the fixation box 21 (the same structure as the fixing bracket 232). The auxiliary fixture secondarily fixes a high insulating portion other than the intermediate connecting portion 15 of the cable core 11 in the fixation box 21.

[Another Example of Fixation Structure of Superconducting Cable Line (1)]

Another example of the fixation structure of the superconducting cable line will be explained. The fixation structure of the superconducting cable line is for fixing two superconducting cable lines using the intermediate fixation portion 20 illustrated in FIG. 3 and the intermediate fixation portion 20B illustrated in FIG. 11 and applies a cooling system 4 using a circulating cooling section 40.

Figure 17:
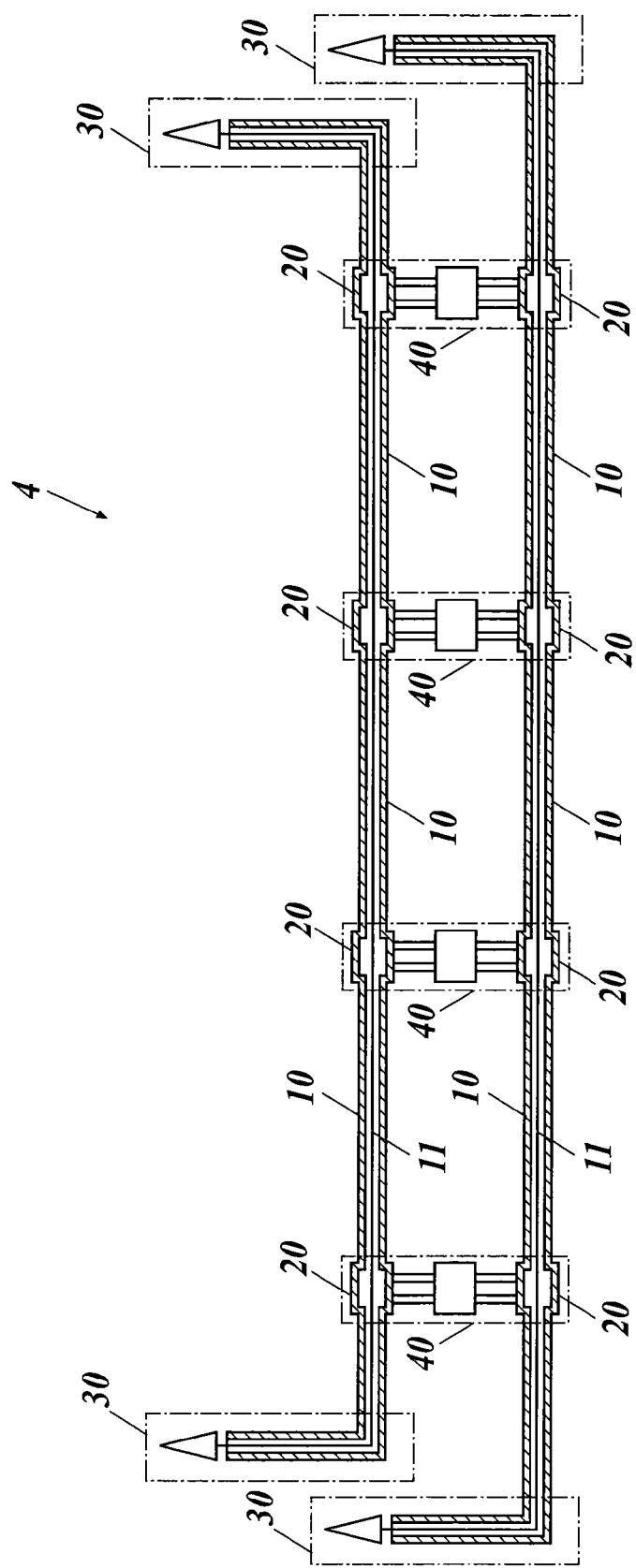
FIG. 17 is a schematic view for illustrating an exemplary installation of a superconducting cable applying a cooling system of a superconducting cable according to an embodiment of the present invention.

FIG. 17 is a schematic view for illustrating an exemplary installation of a fixation structure of a superconducting cable line.

As illustrated in FIG. 17, end connecting portions 30 are placed at each of a power source and a power destination, and the superconducting cable line is supported by intermediate fixation portions 20 therebetween.

When the superconducting cable lines are formed in two lines, a circulating cooling section 40 is provided in the cooling system 4 while being installed between an intermediate fixation portion 20 and the other intermediate fixation portion 20 that are placed at the same positions in the longitudinal direction on the superconducting cable lines.

Note that a superconducting cable line is a superconducting cable that connects a destination (the end connecting portion 30) to the other destination (the end connection porting 30). The superconducting cable line can be formed by a superconducting cable 10 or by a plurality of superconducting cables 10 that are connected to each other with the above-mentioned intermediate connecting portions 15. When a plurality of superconducting cables 10 are connected, an intermediate fixation portion 20C is used in place of the intermediate fixation portion 20. In the example described below, the superconducting cable line is formed by a single superconducting cable 10.

[Circulating Cooling Portion]

Figure 18:
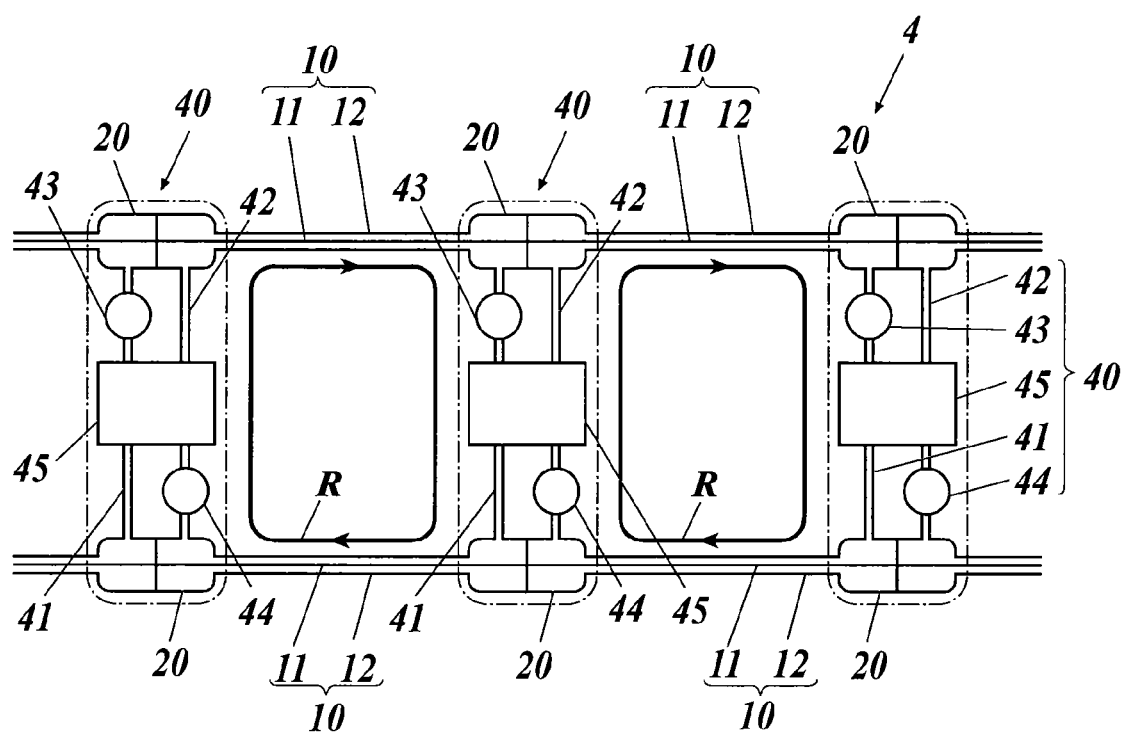
FIG. 18 is a schematic view for illustrating the structure of the cooling system.

FIG. 18 is a schematic view for illustrating the structure of the superconducting cable 10, the intermediate fixation portion 20 and a circulating cooling section 40. As described in the drawing, the circulating cooling section 40 is provided while being installed between the intermediate fixation portions 20 that are placed at the same positions in the longitudinal direction of the two superconducting cable lines formed by the superconducting cables 10.

The circulating cooling section 40 includes a first refrigerant pathway 41, a second refrigerant pathway 42, circulation pumps 43 and 44, and a cooling apparatus 45. Each of the first refrigerant pathway 41 and the second refrigerant pathway 42 is formed by a refrigerant transporting tube that is installed from the intermediate fixation portion 20 on a line of the superconducting cable lines formed by the superconducting cables 10 to the intermediate fixation portion 20 on the other line. The circulation pumps 43 and 44 are provided on the first refrigerant pathway 41 and the second refrigerant pathway 42, respectively. The cooling apparatus 45 is for cooling the refrigerant circulated in each of the first refrigerant pathway 41 and the second refrigerant pathway 42.

Each of the first refrigerant pathway 41 and the second refrigerant pathway 42 has the same structure as the above-mentioned refrigerant transporting tube 30 illustrated in FIG. 6. Both of the first refrigerant pathway 41 and the second refrigerant pathway 42 have double structures including internal tubes 411 and 421, and external tubes 412 and 422. The interior regions between the internal tubes 411 and 421 and the external tubes 412 and 422 are evacuated and have thermal insulation structures. The ends of the refrigerant pathways 41 and 42 are inserted into and connected to the refrigerant circulating apertures 25a and 25b of the above-mentioned intermediate fixation portion 20, respectively. A flange portion is formed at each of the ends of the refrigerant pathways 41 and 42 and the ends of the refrigerant flowing holes 25a and 25b of the intermediate fixation portion 20. The flange portions are bolted and connected to each other. The interior regions between the internal tubes 411 and 421 and the external tubes 412 and 422 of the refrigerant pathways 41 and 42 can be connected with the region between an inner wall 211 and an outer wall 212 of a fixation box 21 of the intermediate fixation portion 20 so that the regions can be evacuated at the same time.

The first refrigerant pathway 41 is connected to one interior region obtained by dividing the intermediate fixation portion 20 with the fixing bracket 23. The second refrigerant pathway 42 is connected to the other interior region obtained by dividing the intermediate fixation portion 20 with the fixing bracket 23.

The structure described above forms a refrigerant pathway R of the refrigerant with the first refrigerant pathway 41 of the circulating cooling section 40, the second refrigerant pathway 42 of the other adjacent circulating cooling section 40, and the thermal insulation tubes 12 of the two superconducting cable 10 positioned between the two circulating cooling sections 40.

The circulation pump 43 pumps the refrigerant in the first refrigerant pathway 41 in a predetermined direction (downward in FIG. 18). The circulation pump 44 pumps the refrigerant in the second refrigerant pathway 42 in the opposite direction (upward in FIG. 18). This circulates the refrigerant through the refrigerant pathway R in a predetermined direction (the clockwise direction in FIG. 18).

In this example of the fixation structure of the superconducting cable lines, a cooling apparatus 45 is shared for cooling the refrigerant flowing in the first refrigerant pathway 41 and the refrigerant flowing in the second refrigerant pathway 42 in a circulating cooling section 40.

Figure 19:
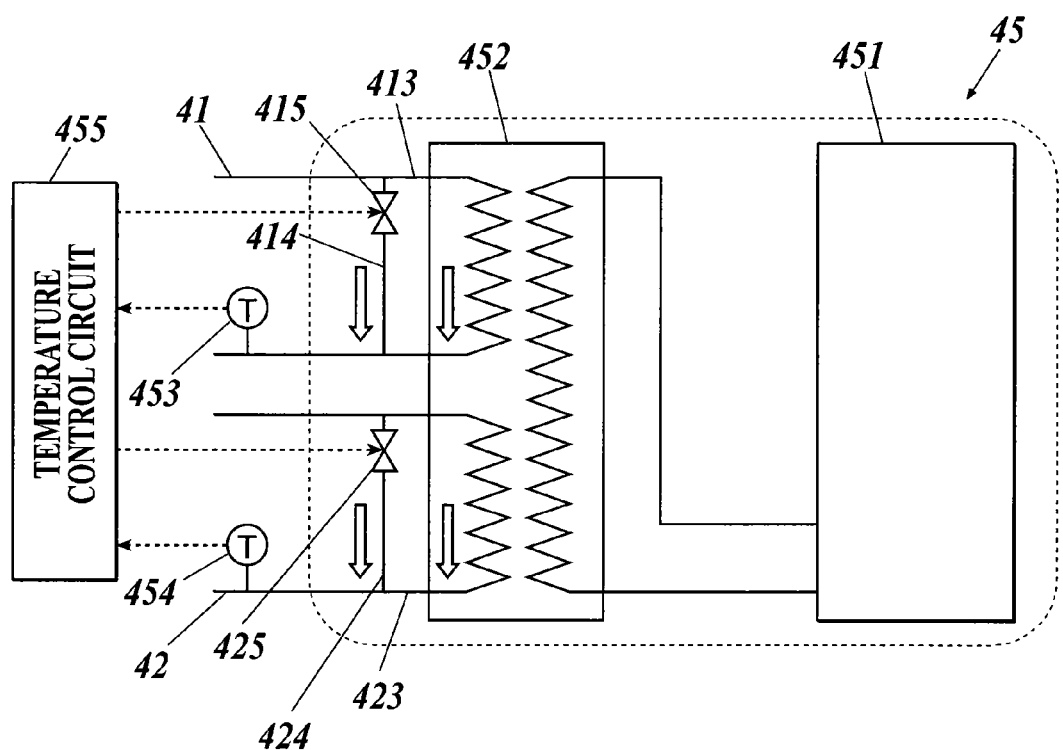
FIG. 19 is a structure view of a cooling apparatus.

FIG. 19 shows a structure of the cooling apparatus 45. The cooling apparatus 45 includes a refrigerator 451 that repeats a cycle of evaporation-compression-condensation-expansion of a refrigerant circulated in the apparatus and a heat exchanger 452 that works as a cooling portion for absorbing the heat from the refrigerants in the first and second refrigerant pathways 41 and 42.

The first and second refrigerant pathways 41 and 42 include input pathways 413 and 423 passing in the heat exchanger 452 and bypass pathways 414 and 424 provided in parallel to the input pathways 413 and 423 for avoiding the heat exchanger 452. Further, valves 415 and 425 for regulating the refrigerants passing in the bypass pathways are provided at the bypass pathways 414 and 424.

Temperature sensors 453 and 454 are provided for detecting the temperatures of the refrigerants just downstream from the cooling apparatus 45 on the first refrigerant pathway 41 and the second refrigerant pathway 42. The temperature sensors 453 and 454 output the signals of the detected temperatures to a temperature control circuit 455 for controlling the flows at the two flow regulating valves 415 and 425.

The flow regulating valves 415 and 425 are control valves capable of individually regulating the flows according to the control signal from the temperature control circuit 455. The temperature control circuit 455 controls the flow regulating valves 415 and 425 to keep the temperature of the refrigerant in each of the refrigerant pathways 41 and 42 within the proper temperature range (for example, 64 to 77 K when the refrigerant is liquid nitrogen). In other words, when the temperature detected by the temperature sensor 453 (or 454) is lower than the proper range, the temperature control circuit controls the flow regulating valve 415 (or 425) to increase the opening of the flow regulating valve in order to reduce the flow of the refrigerant passing through the heat exchanger 452. When the detected temperature is higher than the proper range, the temperature control circuit controls the flow regulating valve 415 (or 425) to decrease the opening of the flow regulating valve in order to increase the flow of the refrigerant passing through the heat exchanger 452.

The cooling apparatus 45 to be used has a capacity large enough to cool the prescribed flow amount of the refrigerant to the temperature lower than the proper temperature.

In the superconducting cable lines including all of the superconducting cables 10 between the two end connecting portions 30, the refrigerant is circulated in each of the refrigerant pathways R by the circulation pumps 43 and 44 while being cooled to a predetermined temperature by the cooling apparatus 45. Thus the cable cores 11 are cooled to the proper temperature. As a result, the electric power can be transmitted from an end connecting portion 30 to the other end connecting portion 30 while the electric resistance of the superconducting cables 10 is significantly reduced.

The temperature of the refrigerant of each of the superconducting cables 10 is raised by the heat invasion from outside or the heat generation of the superconducting cable. However, the temperatures of the refrigerants flowing the first refrigerant pathway 41 and the second refrigerant pathway 42 are constantly detected by the temperature sensors 453 and 454 and are monitored by the temperature control circuit 455 in each of the circulating cooling sections 40 so that the refrigerants are maintained at a proper cryogenic temperature. This prevents the temperatures of the refrigerants from increasing and can avoid the increase in the value of the electric resistance in the superconducting cable 10.

The refrigerator 451 of the cooling apparatus 45 is shared by the first refrigerant pathway 41 and the second refrigerant pathway 42 in the circulating cooling section 40 so that the number of the expensive refrigerators 451 for realizing a cryogenic temperature can be decreased by half. It causes significant reduction of the initial cost of the facility to install the superconducting cable 10.

Further, decreasing the number of the refrigerators 451 also drastically reduces the maintenance cost. Organizing two refrigerators into one decreases the number of the motors and the like by half. This reduces mechanical losses caused by the friction heating, for example, at the bearing of the motor and the refrigeration efficiency can be increased.

When the superconducting cable is installed in a basement of a city, it is desirable to minimize the installation space of the cooling system. According to the embodiments of the present invention, the installation space can also be reduced to approximately 50% in comparison with installation spaces under the same output condition.

The first refrigerant pathway 41 and the second refrigerant pathway 42 include the input pathways 413 and 423 and the bypass pathways 414 and 424 in association with the cooling apparatus 45, and include the temperature control circuit 455 that controls the flow regulating valves 415 and 425 according to the temperatures detected by the temperature sensors 453 and 454. Thus, the refrigerant can be maintained at a proper temperature in each of the refrigerant pathways R and the electric power can stably be transmitted with superconductivity.

[Another Example of Fixation Structure of Superconducting Cable Line (2)]

Although the cooling system 4 is applied to the two single-phase and single-core superconducting cables 10 that are installed in parallel in the example of a fixation structure of a superconducting cable line illustrated in FIG. 18, the superconducting cable is not limited to the example. When two lines of a bundled-three-core type superconducting cable that houses three cable cores 11 in the thermal insulation tube 12 are installed in parallel, the cooling system 4 can be provided in the same way as the above-mentioned embodiment.

Figure 20:
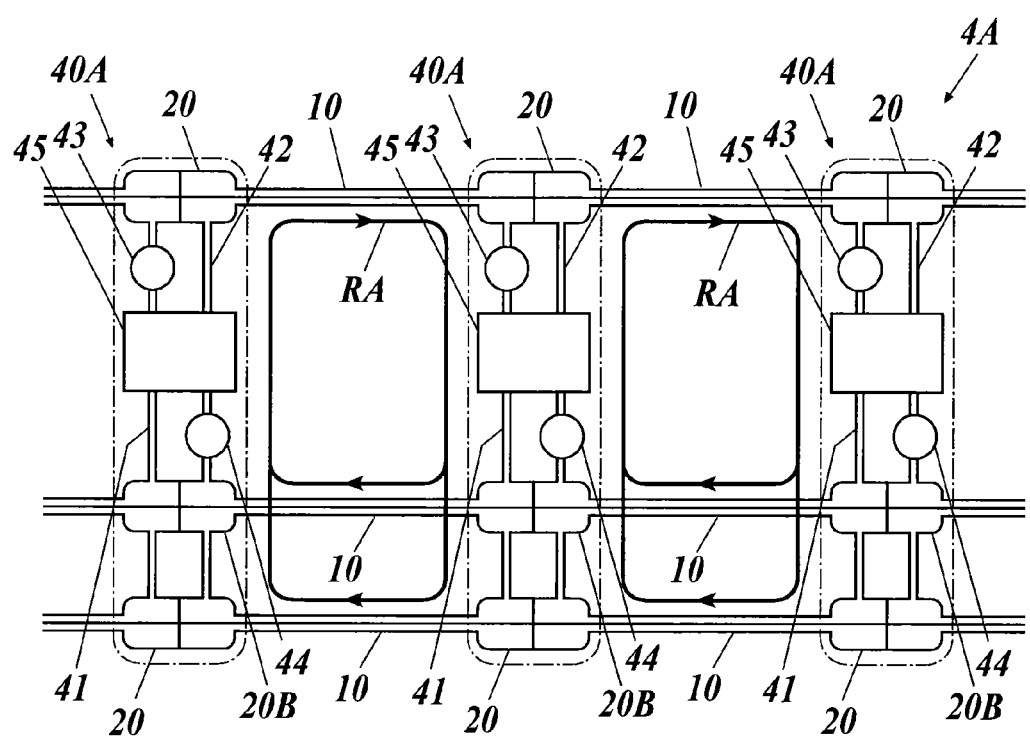
FIG. 20 is a view for illustrating an example when the cooling system is applied to three single-core superconducting cables that are installed in parallel.

When three superconducting cable lines including three single-core type superconducting cables 10 are installed in parallel in order to transmit three-phase current, a cooling system 4A including a circulating cooling section 40A installed over the three superconducting cables 10 can be provided as the example illustrated in FIG. 20. Specifically, in the circulating cooling section 40A, the three superconducting cables 10 installed in parallel transmit three currents in different phases, and a first refrigerant pathway 41 and a second refrigerant pathway 42 are formed so as to connect the three intermediate fixation portions 20 that are provided at the same corresponding positions in the lines, respectively.

In the example illustrated in the drawing, only the intermediate fixation portion 20B (see FIG. 11) that is connected to the second superconducting cable 10 from the top is connected to the first refrigerant pathway 41 and the second refrigerant pathway 42 at both of the upper and lower sides. This forms a refrigerant pathway RA in which the refrigerant that has passed through the top superconducting cable 10 is divided and flows to the second superconducting cable 10 and the third superconducting cable 10 from the top and then the divided refrigerants join into one and the joined refrigerant flows into the top superconducting cable 10 again.

Even in the cooling system 4A having the above-mentioned structure, a cooling apparatus 45 that is shared by the first refrigerant pathway 41 and the second refrigerant pathway 42 is also provided at each of the circulating cooling sections 40A. The same effect as the above-mentioned cooling system 4 can be obtained by virtue of the structure.

Further, in the cooling system 4A, as described above, the flow of the refrigerant in the top superconducting cable 10 is large and the flows of the refrigerants in the other two superconducting cables 10 are small. However, the cooling apparatus 45 of the circulating cooling section 40A can control the flow of the refrigerant passing through the heat exchanger 452 based on the detected temperature of each of the refrigerant pathways. Thus, the flow of the refrigerant passing through the heat exchanger 452 is reduced in the first refrigerant pathway 41, and the flow of the refrigerant passing through the heat exchanger 452 is increased in the second refrigerant pathway 42. Approximately the same cryogenic temperature is maintained at each of the superconducting cables 10 so that the electric power can be transmitted under a consistent condition.

[Another Example of Fixation Structure of Superconducting Cable Line (3)]

Figure 21:
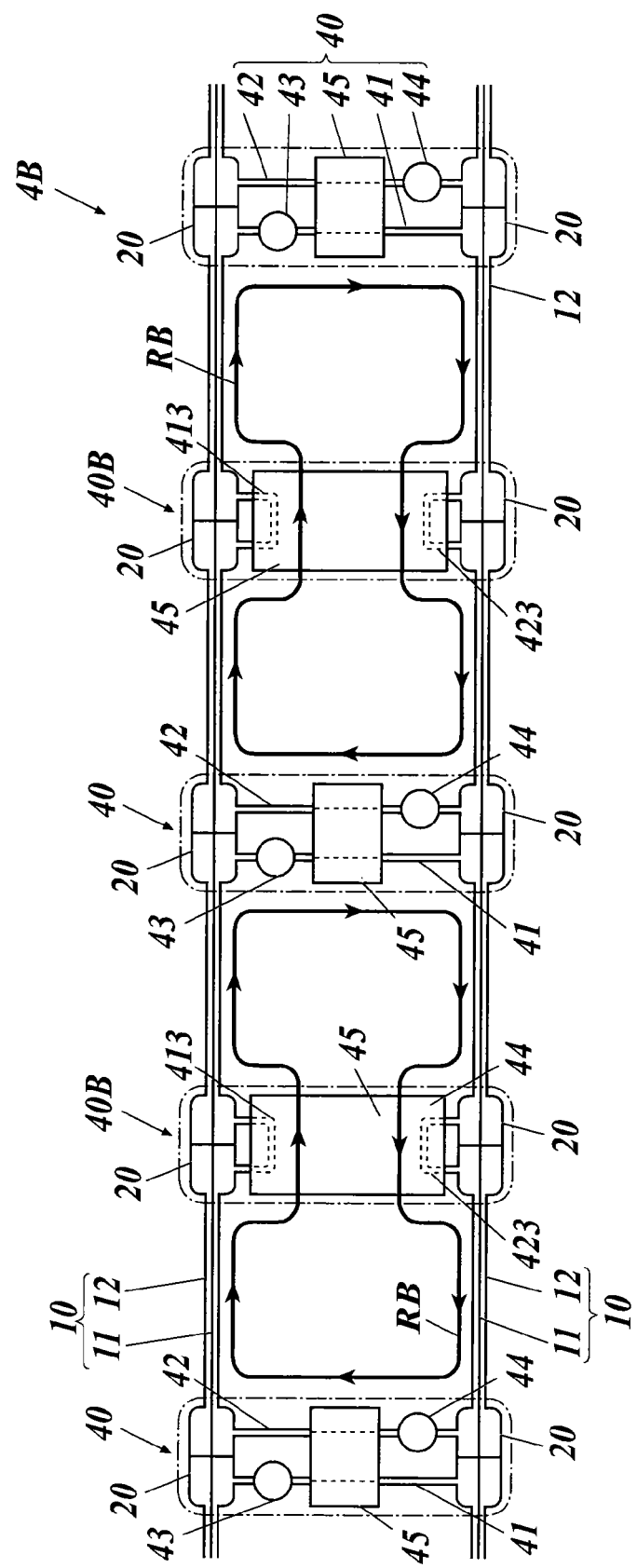
FIG. 21 is a view for illustrating an example when the cooling system that circulates a refrigerant along the superconducting cables on the same line is applied.

Further, the circulating cooling section 40 of the cooling system 4 includes the two circulation pumps 43 and 44. However, when having a sufficient pumping capacity, a cooling system 4B can partially include a circulating cooling section 40B that does not include a circulation pump as illustrated in FIG. 21.

In other words, in the circulating cooling section 40B, refrigerant flowing holes 25a and 25b of an intermediate fixation portion 20 (the intermediate fixation portion 20 on the upper side of FIG. 21) that are provided at one of the superconducting cable lines composed of two parallel superconducting cables 10 are connected to both ends of an input pathway 413 of a cooling apparatus 45. Refrigerant circulating holes 25a and 25b of an intermediate fixation portion 20 (the intermediate fixation portion 20 on the lower side of FIG. 21) that are provided at the other line of the parallel superconducting cables 10 are connected to both ends of an input pathway 423 of the cooling apparatus 45.

Thus, in a refrigerant pathway RB of the refrigerant of the cooling system 4B including the circulating cooling section 40B, the refrigerant is not moved from one superconducting cable line to the other superconducting cable line in the circulating cooling section 40 as in the above-mentioned refrigerant pathway R, but the refrigerant is circulated along the same superconducting cable line through the circulating cooling section 40B.

In this case, the input pathway 413 of the cooling apparatus 45 corresponds to "the first refrigerant pathway", and the input pathway 423 of the cooling apparatus 45 corresponds to "the second refrigerant pathway".

Forming the cooling system 4B as described above can reduce the used number of the circulation pumps capable of circulating the refrigerant at a cryogenic temperature. Thus, the initial cost and the maintenance cost can be reduced.

[Others]

Hereinabove, the invention made by the present inventors has been described in detail based on the embodiments. However, the present invention is not limited to the above-mentioned embodiments and can be modified without departing from the gist of the present invention.

Further, in the examples, the circulating cooling section 40 (or, 40A or 40B) is provided at each of the intermediate fixation portions 20 in the cooling system 4 (or, 4A or 4B). However, the installation interval between the circulating cooling sections 40 (or, 40A or 40B) is arbitrarily adjustable. For example, a circulating cooling sections 40 (or, 40A or 40B) can be provided every multiple intermediate fixation portions 20.

Further, in the circulating cooling section 40 (or 40A), the circulation pumps 43 and 44 are provided at the first refrigerant pathway 41 and the second refrigerant pathway 42, respectively. However, only one of the first refrigerant pathway 41 and the second refrigerant pathway 42 has to include a circulation pump. Even in such a case, the refrigerant can be circulated because a refrigerant pathway R (or RA) includes at least one circulation pump.

This can reduce the number of the circulation pumps that can be used at a cryogenic temperature. Thus, the initial cost and the maintenance cost can be reduced.

Further, the circulation pumps 43 and 44 are placed at the upstream side of the cooling apparatus 45 in the refrigerant pathways 41 and 42. This can promptly cool the refrigerants even if the heat generated from the circulation pumps 43 and 44 is conducted to the refrigerants. However, if the amount of the heat conducted from the circulation pumps 43 and 44 is significantly small, the circulation pumps 43 and 44 can be placed at the downstream side of the cooling apparatus 45.

Although the superconducting cable line of the circulating cooling section 40, 40A, or 40B includes the one superconducting cable 10 in the examples, the superconducting cable line can include a plurality of the superconducting cables 10 of which each ends are connected to each other. In that case, it is preferable that the intermediate fixation portion 20 or 20A connects the superconducting cables 10 to each other with the intermediate connecting portion 15 as the example of the intermediate fixation portion 20C (see FIG. 13) in order to support the superconducting cables with the same support structure as the intermediate fixation portion 20C.

The present application claims priority to Japanese Patent Applications No. 2011-058788 filed on Mar. 17, 2011 and No. 2011-058795 filed on Mar. 17, 2011, the contents of which, including specification, claims, drawings and summary are incorporated herein by reference in their entirety.

INDUSTRIAL APPLICABILITY

The present invention can be used in the field where a cryogenic superconducting cable is installed with a fixation structure in order to transmit electric power.

REFERENCE SIGNS LIST

10: Superconducting cable
11: Cable core
111: Former
112: Superconductor layer
113: Electrical insulation layer
113a: Taper
113b: Diameter-expanded reinforcement and electrical insulation layer
113c: Connecting electrical insulation layer (Electrical insulation layer)
114: Superconducting shield layer
115: Normal conduction shield layer
116: Protection layer 12: Insulation tube
121: Insulation internal tube (Internal tube, Refrigerant pathway)
122: Insulation external tube (External tube)
15: Intermediate connecting portion
20, 20A, 20B, 20C: Intermediate fixation portion (Fixation structure)
21: Fixation box
211: Inner wall
212: Outer wall
22: Fixation block (Fixation body and Sleeve)
23: Fixing bracket (Fixation body)
24: Thermosetting resin (Connection portion)
25a, 25b, 25c, 25d: Refrigerant flowing hole
30: Refrigerant transporting tube
201: Diameter-expanded reinforcement layer
201a: Isodiametric portion
201b: Tapered portion
202: Reinforcement layer
30: End connecting portion
4, 4A, 4B: Cooling system
40, 40A, 40B: Circulating cooling portion
41: First refrigerant pathway (Refrigerant transporting tube)
42: Second refrigerant pathway (Refrigerant transporting tube)
411, 421: Internal tube
412, 422: External tube
413: Input pathway (First refrigerant pathway)
423: Input pathway (Second refrigerant pathway)
414, 424: Bypass pathway
415, 425: Flow regulating valve
43, 44 Circulation pump
45: Cooling apparatus
451: Refrigerator
452: Heat exchanger (Cooling portion)
453, 454: Temperature sensor
455: Temperature control circuit

The invention claimed is:

1. A fixation structure of a superconducting cable comprising a cable core which comprises a former and a superconductor layer, and a thermal insulation tube housing the cable core and having a thermal insulation structure configured of an internal tube and an external tube, the fixation structure comprising:
a fixation box connected to the thermal insulation tube, having a thermal insulation structure configured of an inner wall and an outer wall, through which the cable core penetrates;
a fixation body for fixing the cable core on the inner wall of the fixation box; and
a diameter-expanded reinforcement layer, the diameter-expanded reinforcement layer being electrically insulating, being formed on the cable core and having a diameter decreasing toward both ends, wherein an entire length of the diameter-expanded reinforcement layer is formed on the cable core;
wherein a refrigerant can flow through an inside of the inner wall of the fixation box, and
the cable core is fixed on the inner wall with a fixation body through the diameter-expanded reinforcement layer.

2. The fixation structure of a superconducting cable according to claim 1,
wherein the fixation body comprises a sleeve having a shape corresponding to a shape of an outer surface of the diameter-expanded reinforcement layer.

3. The fixation structure of a superconducting cable according to claim 1 or 2, further comprising a reinforcement layer around the diameter-expanded reinforcement layer, and
wherein the fixation body holds the diameter-expanded reinforcement layer through the reinforcement layer.

4. The fixation structure of a superconducting cable according to claim 1 or 2 further comprising a connection portion for bonding and connecting the cable core to the fixation body.

5. The fixation structure of a superconducting cable according to claim 1,
wherein the cable core comprises an electrical insulation layer on an outer surface of the superconductor layer and an intermediate connecting portion having a connecting portion of the electrical insulation layer in the fixation box, and
the diameter-expanded reinforcement, which is larger than an outside diameter of the electrical insulation layer at a portion other than the intermediate connecting portion, is formed at an outer surface of the connecting portion of the electrical insulation layer in the intermediate connecting portion.

6. The fixation structure of a superconducting cable according to claim 5, wherein the diameter-expanded reinforcement layer is layered to cover the electrical insulation layer layered between tapered electrical insulation layers of two cable cores in the intermediate connecting portion, the tapered electrical insulation layers and a splice of the insulation layer layered between the electrical insulation layers.

7. The fixation structure of a superconducting cable according to claim 5 or 6,
wherein a kind of insulating papers is wound around the diameter-expanded reinforcement layer.

8. The fixation structure of a superconducting cable according to claim 1 or 2, further comprising at least one auxiliary fixation body for fixing the cable core on the inner wall,
wherein the auxiliary fixation body is fixed on the inner wall with a rod-shaped or block-shaped fixing bracket through a metal ring holding an outer circumference of the cable core.

9. The fixation structure of a superconducting cable according to claim 1 or 2,
wherein the fixation body is fixed on the inner wall with a rod-shaped or block-shaped fixing bracket through a sleeve covering an outer surface of the cable core.

10. The fixation structure of a superconducting cable according to claim 1,
wherein the fixation body is fixed on the inner wall while dividing an interior region of the fixation box into two,
one or more refrigerant flowing holes are formed on the fixation box at both sides with respect to the fixation body, and the inner wall and the outer wall are connected at the refrigerant flowing hole.

11. The fixation structure of a superconducting cable according to claim 10,
wherein a refrigerant transporting tube is connected to the refrigerant flowing hole.

12. The fixation structure of a superconducting cable according to claim 11,
wherein the refrigerant flowing holes that are formed at both sides with respect to the fixation body are connected to each other through the refrigerant transporting tube.

13. A fixation structure of a superconducting cable line that fixes a plurality of superconducting cables using the fixation structure according to claim 11, wherein each of the superconducting cables comprises a fixation box, and the fixation boxes are connected to each other through the refrigerant transporting tube connected to the refrigerant flowing hole.

14. The fixation structure of a superconducting cable line according to claim 13,
wherein a refrigerant in the fixation boxes does not flow from one side to an other side of the fixation body along the superconducting cable, instead the refrigerant flows to the other fixation box through the refrigerant transporting tube connected to the refrigerant flowing hole.

15. A fixation structure of a superconducting cable line using the fixation structure according to claim 10 or 11,
wherein a plurality of superconducting cables are placed in parallel, and circulating cooling sections are installed for the superconducting cables at predetermined intervals through the fixation box,
the circulating cooling section comprising;
a first refrigerant pathway connecting with refrigerant pathways of the superconducting cables,
a second refrigerant pathway connecting with refrigerant pathways of the other superconducting cables, and
a refrigerator for cooling the refrigerant circulated in the first refrigerant pathway and the second refrigerant pathway, respectively,
wherein each of the first refrigerant pathway and the second refrigerant pathway connects the fixation boxes through the respective refrigerant flowing holes at both sides of the fixation box with respect to the fixation body.

16. The fixation structure of a superconducting cable line according to claim 15,
wherein the circulating cooling section comprises a circulation pump of the refrigerant at only one of the first refrigerant pathway and the second refrigerant pathway.

17. The fixation structure of a superconducting cable line according to claim 15,
wherein the circulating cooling section comprises an input pathway passing into a cooling portion of the refrigerator and a bypass pathway avoiding the refrigerator at each of the first refrigerant pathway and the second refrigerant pathway,
a temperature of the refrigerant is controlled by adjusting flows of the refrigerants of the input pathway and of the bypass pathway.

18. The fixation structure of a superconducting cable line according to claim 15,
wherein each of the first refrigerant pathway and the second refrigerant pathway of the circulating cooling section leads the refrigerant from a superconducting cable to a different superconducting cable through the refrigerant pathway.

19. The fixation structure of a superconducting cable line according to claim 15,
wherein each of the first refrigerant pathway and the second refrigerant pathway of the circulating cooling section leads the refrigerant from a superconducting cable to the same superconducting cable through the refrigerant pathway.

* * * * *